US006383275B1

(12) United States Patent
Lin

(10) Patent No.: US 6,383,275 B1
(45) Date of Patent: *May 7, 2002

(54) INK JET INK COMPOSITIONS AND PRINTING PROCESSES

(75) Inventor: John Wei-Ping Lin, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/449,708

(22) Filed: Nov. 24, 1999

(51) Int. Cl.$^7$ .............................................. C09D 11/02
(52) U.S. Cl. ................ 106/31.27; 106/31.28; 106/31.43; 106/31.58; 106/31.6; 106/31.75; 106/31.86
(58) Field of Search ................... 106/31.27, 31.28, 106/31.43, 31.58, 31.6, 31.75, 31.86

(56) References Cited

U.S. PATENT DOCUMENTS

| | | | |
|---|---|---|---|
| 4,327,174 A | 4/1982 | Von Meer | 430/530 |
| 4,985,710 A | 1/1991 | Drake et al. | 346/1.1 |
| 5,019,166 A * | 5/1991 | Schwarz | 106/31.59 |
| 5,057,854 A | 10/1991 | Pond et al. | 346/140 R |
| 5,098,503 A | 3/1992 | Drake | 156/299 |
| 5,145,518 A | 9/1992 | Winnik et al. | 106/31.15 |
| 5,192,959 A | 3/1993 | Drake et al. | 346/140 R |
| 5,198,023 A | 3/1993 | Stoffel | 106/31.27 |
| 5,220,346 A | 6/1993 | Carreira et al. | 346/1.1 |
| 5,281,261 A | 1/1994 | Lin | 106/31.6 |
| 5,356,464 A | 10/1994 | Hickman et al. | 106/31.58 |
| 5,371,531 A | 12/1994 | Rezanka et al. | 347/43 |
| 5,401,303 A | 3/1995 | Stoffel et al. | 106/31.43 |
| 5,432,539 A | 7/1995 | Anderson | 347/33 |
| 5,488,402 A | 1/1996 | Shields et al. | 347/96 |
| 5,518,534 A | 5/1996 | Pearlstine et al. | 106/31.6 |
| 5,531,818 A | 7/1996 | Lin et al. | 106/31.28 |
| 5,570,118 A | 10/1996 | Rezanka et al. | 347/43 |
| 5,693,129 A | 12/1997 | Lin | 106/31.43 |
| 5,851,274 A | 12/1998 | Lin | 106/31.43 |
| 5,900,899 A | 5/1999 | Ichizawa et al. | 347/100 |
| 5,958,121 A * | 9/1999 | Lin | 106/31.43 |
| 6,039,793 A * | 3/2000 | Gundlach et al. | 106/31.28 |

* cited by examiner

Primary Examiner—Helene Klemanski
(74) Attorney, Agent, or Firm—Lahive & Cockfield, LLP

(57) ABSTRACT

The present invention relates to aqueous ink jet ink compositions comprising an anti-intercolor bleed agent, preferably a water soluble or ink-compatible agent. The inks typically also comprise water and at least a colorant of a dye, a pigment, or a mixture of dye and pigment. In one embodiment, ink jet ink compositions comprising an anti-intercolor bleed agent which is represented by $\{[(R)_m—G_b]_n\}_s(A)(X)_p$ (Formula (I)), and ink jet printing processes which print the ink jet ink compositions in any desired printing sequence or order onto an optionally heated substrate are provided. The water-soluble or ink-compatible anti-intercolor bleed agent may form hydrophobic layers near the image boundary, thus preventing undesired mixing of two different neighboring inks which forms intercolor bleed. The ink jet ink compositions of the present invention exhibit reduced drying time, intercolor bleeding, and image defect as well as providing uniform ink images on transparencies.

37 Claims, No Drawings

INK JET INK COMPOSITIONS AND PRINTING PROCESSES

BACKGROUND OF THE INVENTION

The present invention relates to ink jet ink compositions containing an additive and printing processes. In an embodiment, the present invention relates to ink jet ink compositions containing anti-intercolor bleed agents which are water soluble or ink-compatible acid salts, and printing processes which utilize these ink compositions. The ink jet ink compositions of the present invention are particularly suitable for ink jet printing processes.

Ink jet printing process is a non-impact printing method that produces droplets of ink that are deposited on a substrate such as paper or transparent film in response to an electronic digital signal. Non-impact printing methods and systems include drop-on-demand ink jet printing processes and continuous-stream ink jet printing processes. Drop-on-demand ink jet printing processes include thermal ink jet printing processes, acoustic ink jet printing processes, and piezoelectric ink jet printing processes. Thermal or bubble jet drop-on-demand ink jet printers and piezoelectric ink jet printers have found broad application as output for personal computers in the office and in the home.

In existing thermal ink jet printing processes, the printhead typically comprises one or more ink jet ejectors, each ejector including a channel communicating with an ink supply chamber, or manifold, at one end and having an opening at the opposite end, referred to as a nozzle. A thermal energy generator, usually a resistor, is located in each of the channels, at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation of the bulging ink from the nozzle as a droplet. The acceleration of the ink out of the nozzle while the bubble is growing provides the momentum and velocity for propelling the droplet in a substantially straight line direction towards a print substrate, such as a piece of paper or a transparency. Because the droplet of ink is emitted only when the resistor is actuated, this type of thermal ink jet printing process is known as "drop-on-demand" ink jet printing process. Other types of drop-on-demand ink jet printing processes include piezoelectric and acoustic ink jet printing processes. Several drop-on demand ink jet printing processes are described in U.S. Pat. No. 5,281,261, the disclosure of which is totally incorporated herein by reference.

Continuous-stream ink jet printing process is known to print on a substrate by placing ink droplets at desired locations while deflecting ink droplets away from the non-imaging areas. This type of ink jet printing is different from the drop-on-demand method, and is described in, e.g., U.S. Pat. No. 5,281,261, the disclosure of which is totally incorporated herein by reference.

In an ink jet printing apparatus, the printhead typically comprises a linear array of ejectors. However, for faster ink jet printing, several printheads may be butted together to form a partial-width printhead. The printhead or partial-width printhead is moved relative to the surface of the print substrate, either by moving the print substrate relative to a stationary printhead, or vice-versa, or both. In some types of apparatus, a relatively small printhead moves across a print substrate numerous times in swathes, in order to complete a desired image. A partial image is created with each swath of the printhead movement. This type of ink jet printing is called multi-pass or checkerboard printing process.

Alternatively, a printhead, such as a full-width printhead or printbar comprising several butted printheads, consisting of an array of ejectors and extends the full width, or any desired length, of the print substrate may be held stationary. An ink may be deposited onto the print substrate one line at a time by the full-width printhead, or partial-width printhead covering a portion of the width of a substrate, as the print substrate passes by, until full-page images are completed. This type of ink jet printing process uses a single pass method and it is carried out in what is usually known as a "full-width array" printer or a "partial-width array" printer. When the full-width or partial-width array printhead and the print substrate are moved relative to each other, image-wise digital data are used to selectively activate the thermal energy generators in the printhead over time so that the desired image will be created on the print substrate. In a multi-color ink jet printing process several full-width or partial-width array printheads can be used in a printer to deposit different color inks (e.g., black, cyan, magenta, and yellow inks, as well as other optionally selected inks) onto a print substrate to give full color images. In this so-called "single pass method" the printheads are usually held stationary while the imaging substrate moves by (or move under) the printheads.

Aqueous inks used in ink jet printing generally have water as a major component. Water has the advantage of being non-toxic, non-combustible and environmentally sound relative to non-aqueous inks, which are largely composed of organic solvents. Water is also an excellent medium for dispersing pigments or dissolving dyes. Water is also used for bubble formation as a propellant for the ink in a thermal ink jet printing process.

In a multi-color ink jet printing process, a phenomenon known as "inter-color bleed" may occur. This effect is described in, e.g., U.S. Pat. No. 5,371,531, the disclosure of which is totally incorporated herein by reference. This phenomenon is the bleed of one portion of the color image into another portion of the neighboring image in an adjacent area of two different inks. This becomes most apparent when a black ink is imaged immediately adjacent to an area printed with a color ink such as cyan, magenta or yellow ink. In such a case, the black ink (usually a slow or medium dry ink which usually exhibits good edges for text and high optical density) will be seen to bleed into the color area or vice versa to create a conspicuous print defect which is called intercolor bleed. In some cases the black ink may generally possess high surface tension, while the color inks are generally fast dry inks with low surface tension. Intercolor bleed can take place quickly once the inks are printed a substrate, e.g., on plain paper or transparency before drying (e.g., before microwave or radiant heating). For example, printing a slow dry black ink immediately followed by a color ink, especially a yellow ink before the black ink can completely dry, can show undesired inter-color bleed phenomenon with poor print quality. The intercolor bleed between a black ink and neighboring yellow ink is especially sensitive to human eyes due to high color contrast. Intercolor bleed can also take place on a substrate between two color inks (e.g. between yellow and cyan ink, magenta and yellow inks, cyan and magenta inks, etc.).

SUMMARY OF THE INVENTION

Aspects of the present invention relate to aqueous ink jet ink compositions comprising a water-soluble or ink-compatible anti-intercolor bleed agent and ink jet printing processes. In a preferred embodiment the anti-intercolor bleed agent is one which is water soluble or ink-compatible. The ink jet ink (ink jet ink composition) of this invention typically comprise water, at least a colorant (e.g., a dye or a pigment or a mixture of dye and pigment), and a water soluble or ink-compatible anti-intercolor bleed agent. Ink jet ink compositions of the invention reduce intercolor bleed, ink drying time and smear, and improve image quality on a substrate.

In one embodiment the anti-intercolor bleed agent of the invention includes those materials represented by the following formula (Formula (I)):

   Formula (I)

wherein

R is a $C_1$ to about $C_{30}$ alkyl, alkenyl, alkynyl, or aryl group;

G is an aromatic group of about $C_6$ to about $C_{10}$, e.g., phenyl ($C_6H_{(5-m)}$) or naphthyl ($C_{10}H_{(7-m)}$) group, or a cyclic alkyl group of about $C_3$ to about $C_{20}$, e.g., of the formula $C_TD_{2T-1-m}$, wherein D is a hydrogen atom;

A is an acid functional group or a water compatible group comprising at least an alkyleneoxide moiety (e.g., ethyleneoxide or propyleneoxide or mixtures thereof). Suitable acid functional groups include sulfonic acid ($—SO_3^-$), carboxylic acid ($—CO_2^-$), and phosphonic acid ($—HPO_3^-, —PO_3^{-2}$) functional groups. Suitable water compatible groups include at least one or more alkyleneoxide moiety such as ethyleneoxide or propyleneoxide or mixtures thereof;

X is a cation such as a hydrogen ion ($H^+$), an alkali metal ion, e.g., monovalent cations including $Li^+$, $Na^+$, $K^+$, $Rb^+$, $Cs^+$, $Ag^+$, and $Fr^+$, or multivalent metal cations including $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$, etc., or ammonium group of the general formula (Formula (II))

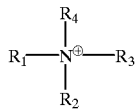   (Formula (II))

wherein $R_1$, $R_2$, $R_3$, and $R_4$ are independently selected from hydrogen (e.g., $NH_4^+$, or $NCH_3H_3^+$), lower alkyl group (e.g., methyl, ethyl, propyl, butyl, pentyl, hexyl, etc.), and lower hydroxyalkyl groups (e.g., hydroxyethyl, hydroxypropyl, hydroxybutyl, etc.), or alternately a hydrogen, amine, hydroxyl, or alkyl group when A is a water compatible group (e.g., comprising one or more alkyleneoxide moieties such as ethyleneoxide, or propyleneoxide, or polyethyleneoxide or polypropyleneoxide or poly(ethyleneoxide-co-propyleneoxide)); and m is a number in the range of about 1 to about 10, b is 0 or 1, n is 1 or 2, p is 1 or 2, s is 1 or 2, and T is a number in the range of about 3 to about 20.

The above anti-intercolor bleed agents are either water soluble or ink-compatible (i.e., compatible with the ink medium) and they may be well-dispersed in ink jet ink compositions without causing an instability problem. Various humectants, surfactants, penetrants, anti-curl agents, water, and additives can be used in conjunction with the anti-intercolor bleed agents to ensure good ink compatibility and stability.

In a further embodiment, the ink jet ink compositions comprise at least a water soluble or ink-compatible anti-intercolor bleed agent of Formula (I) wherein b=0, n=1, m=1, and A is $—CO_2^-$; i.e.,

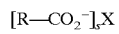   (Formula (III))

wherein R is a $C_1$ to about $C_{30}$ alkyl, alkenyl, alkynyl, or aryl group (R can optionally be a linear, branched or cyclic hydrocarbon group), either with or without a heteroatom of oxygen or nitrogen; s is 1 or 2; and X is the same as described above. In another embodiment of the Formula (III) wherein s is 1 and X is a cation, e.g., as represented by Formula (II) shown above.

In another embodiment, ink-compatible anti-intercolor bleed agents of the invention may be reaction products of various organic carboxylic acids and amines which are selected from ammonia, primary, secondary or tertiary amines. The amines may be linear, cyclic or aromatic amines, as well as amines containing one or more hydroxyl groups. In preferred embodiments, the amines have fewer than thirty carbon atoms.

The anti-intercolor bleed agents can facilitate ink drying and may form a hydrophobic layer near the image boundary adjacent to another color ink, thus preventing undesired mixing of different neighboring inks which forms intercolor bleeding. The inks of the invention exhibit reduced drying time, reduced intercolor bleed, and reduced image defect as well as providing a uniform ink image (e.g., in solid areas) on transparencies. The ink jet inks in some cases are also believed to increase jetting frequency and to provide desired jetting performance and adequate drop mass to form images with high optical density.

The ink jet ink compositions further comprise water and a colorant such as a water soluble or dispersible dye or pigment, or mixture thereof. Desired humectant and ink additives can also be used to enhance ink physical properties. The ink jet ink compositions can be used in a multi-color ink jet printing process to give high quality images on a substrate with good drying, low inter-color bleed, and without an undesired smearing problem.

The ink jet ink compositions of the present invention may optionally comprise additives such as pH buffering agents, water soluble monovalent or multivalent cationic salts for coupling with a microwave dryer or reduction of bleed, jetting aids, anti-curl agents, ink penetrants, water soluble biocides, polymeric binders, surfactants, pigment dispersants, anti-kogation agents, anti-cockle agents, and other desired additives.

The ink jet inks of the present invention may suitably be prepared as black or color ink jet inks for high quality, high speed, and high resolution (e.g., printhead resolution ≧300 spi, 400 spi, 600 spi, 720 spi, 800 spi, 1200 spi, 1440 spi, etc.) ink jet printing with single, partial-width, or full-width array printheads. The present invention also provides ink jet ink compositions which can have (1) adequate latency in a printer, (2) high frequency response with the ability for high speed ink jet printing, (3) the desired jetting performance of a high resolution ink jet ink printhead, and (4) desired fast drying property and good print quality of images on a substrate, as well as multi-color images with the reduction of (i) intercolor bleeding, (ii) smear, and (iii) paper curl.

In addition, the ink jet ink compositions of this invention are particularly useful for printing high quality multi-color images on a substrate in conjunction with a pigment ink (e.g., carbon black ink) in a multi-color ink jet printer. Different ink printing sequences (e.g., [Yellow (Y), Cyan (C), Magenta (M), and Black (K), YCMK]; YMCK; KMCY; KCMY; CYMK; CMYK; MCYK; MYCK; etc.) can be employed in the multi-color ink jet printing process in which the imaging substrate can be optionally heated at any stage of the ink jet printing process including before, during, and after ink jet printing as well as combinations thereof (before and/or during and/or after printing). In a particularly advantageous embodiment, ink jet ink compositions are used which comprise a water-compatible anti-intercolor bleed agent which is an ammonium salt wherein the imaging substrate is heated at any stage of the ink jet printing process including before, during, and after ink jet printing as well as combinations thereof (before and/or during and/or after printing). Heating the substrate enhances the anti-intercolor bleed properties of the inks, leading to improved image quality.

Furthermore, the ink jet ink compositions of this invention can be printed by an ink jet printing process selected from either a multiple pass method (checkerboard method) or a single pass method for desired printing speed. The use of ink jet ink compositions of this invention in a single pass method can greatly increase the capability of printing speed of an ink jet printer, particularly when full-width array ink jet printheads are employed.

In another embodiment, the ink jet ink compositions are used in one or more high resolution printheads (e.g., resolution ≧300 spi; 400 spi, 600 spi, 720 spi, 1200 spi, 1440 spi, etc.) to produce high quality images with good resolution.

The ink jet printing process of this invention can employ either a single pass method or a multi-pass, or checkerboard, method using any desired dye-based or pigment-based ink jet inks. Heating the images of the first ink and the substrate before printing the second ink and other inks allows the first ink to be dried properly so that it will reduce inter-color bleed between the first ink and the second ink or other inks. Heating the images of the inks of this invention comprising the thermally decomposable anti-intercolor bleed agents and print substrate provides a hydrophobic barrier for the added benefit of reduction of inter-color bleed.

DETAILED DESCRIPTION OF THE INVENTION

The present invention relates to aqueous ink jet ink compositions comprising an ink-compatible anti-inter-color bleed agent. The ink jet ink composition of the invention comprises water, at least a colorant, (e.g., a dye or a pigment or a mixture of dye and pigment), and an anti-intercolor bleed agent which is represented by Formula (I):

$$\{[(R)_m\text{---}(G)_b]_n\}_s(A)(X)_p \quad \text{Formula (I)}$$

wherein

R is a $C_1$ to about $C_{30}$ alkyl, alkenyl, alkynyl, or aryl group;

G is an aromatic group of about $C_6$ to about $C_{10}$, e.g., phenyl ($C_6H_{(5-m)}$) or naphthyl ($C_{10}H_{(7-m)}$) group, or a cyclic alkyl group of about $C_3$ to about $C_{20}$, e.g., of the formula $C_TD_{(2T-1-m)}$, wherein D is a hydrogen atom;

A is an acid functional group or a water compatible group comprising at least an alkyleneoxide moiety (e.g., ethyleneoxide or propyleneoxide or mixtures thereof). Suitable acid functional groups include sulfonic acid ($-SO_3^-$), carboxylic acid ($-CO_2^-$), and phosphonic acid ($-HPO_3^-$, $-PO_3^{-2}$) functional groups. Suitable water compatible groups include at least one or more alkyleneoxide moiety such as ethyleneoxide or propyleneoxide or mixtures thereof;

X is a cation such as a hydrogen ion ($H^+$), an alkali metal ion, e.g., monovalent cations including $Li^+$, $Na^+$, $K^+$, $Rb^+$, $Cs^+$, $Ag^+$, and $Fr^+$, or multivalent metal cations including $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$, etc., or ammomium compounds of the general formula (Formula (II))

Formula (II)

wherein $R_1$, $R_2$, $R_3$, and $R_4$ are independently selected from hydrogen, lower alkyl group (e.g., methyl, ethyl, propyl, butyl, pentyl, hexyl, etc.), and lower hydroxyalkyl groups (e.g., hydroxyethyl, hydroxypropyl, hydroxybutyl, etc.), e.g., $NH_4^+$, or $N\ CH_3H_3^+$; or alternately a hydrogen, amine or hydroxyl group when A is a water compatible group, e.g., comprising one or more alkyleneoxide moieties such as ethyleneoxide, propyleneoxide, polyethyleneoxide or polypropyleneoxide or poly(ethyleneoxide-co-propyleneoxide); and m is a number in the range of about 1 to about 10, b is 0 or 1, n is 1 or 2, s is 1 or 2, p is 1 or 2, and T is a number in the range of about 3 to about 20.

In another embodiment, an ink jet ink composition comprises water, at least a colorant, (e.g., a dye or a pigment or a mixture of dye and pigment), and an anti-intercolor bleed agent which is represented by Formula (III)

$$R_d\text{---}CO_2^-X \quad \text{(Formula (III))}$$

wherein $R_d$ is hydrogen, an about $C_1$ to about $C_{30}$ alkyl, alkenyl, alkynyl, or aryl group; $R_d$ can optionally be a linear, branched or cyclic hydrocarbon group, either with or without a heteroatom of oxygen or nitrogen; s is 1 or 2; and X is a cation as described previously. In another embodiment $R_d$ is selected from an alkyl, alkenyl, alkynyl and aryl group, and X is an ammonium cation represented by formula II. $R_1$, $R_2$, $R_3$, and $R_4$ are each independently selected from a hydrogen atom, an alkyl group (e.g., methyl, ethyl, propyl, butyl, pentyl, hexyl, etc.), a cyclic alkyl group (e.g., cyclopropyl, cyclobutyl, cyclopentyl, cyclohexyl, pyrrole, piperidino, morpholino, etc.) and hydroxyalkyl group (e.g., hydroxyethyl, hydroxylpropyl, hydroxypropyl, hydroxybutyl, hydroxyethoxyethyl, etc.). $R_d$ may be a linear, branched, cyclic, or aromatic hydrocarbon group, either with or without a heteroatom of oxygen or nitrogen and has between about one to about thirty carbon atoms ($C_1$–$C_{30}$) per mole of ammonium salt moiety, and preferably between about five and about thirty carbon atoms ($C_5$–$C_{30}$) per mole of ammonium salt moiety. In a further embodiment, $R_d$ is hydrogen and s is one or two.

In a further embodiment, the anti-intercolor bleed agent is represented by the following formula:

$$[R_dA]_sX$$

wherein s=1; $R_d$ is an about $C_5$ to about $C_{30}$ alkyl, alkenyl, alkynyl, or aryl group; A is a water compatible group comprising at least one alkyleneoxide moiety is selected from ethyleneoxide, propyleneoxide, polyethyleneoxide, and polypropyleneoxide, and mixtures thereof; and X is selected from the group consisting of hydrogen, amine, hydroxyl, and alkyl groups.

In another embodiment, the ammonium salts may be products of carboxylic acids and amines selected from ammonia, primary, secondary or tertiary amines. The amines may be selected from a group consisting of ammonia, linear, cyclic, and aromatic amines as well as hydroxyalkylamines. In a preferred embodiment, the amine has less than thirty carbon atoms.

Examples of the carboxylic acid ammonium salts include, but are not limited to, formic acid ammonium salts, acetic acid ammonium salts, propionic acid ammonium salts, hexanoic acid ammonium salts, heptanoic acid ammonium salts, octanoic acid ammonium salts, decanoic acid ammonium salts, dodecanoic acid ammonium salts, myristic acid ammonium salts, stearic acid ammonium salts, oleic acid ammonium salts, palmitic acid ammonium salts, palmitoleic acid ammonium salts, fatty acid ammonium salts, cyclohexanoic acid ammonium salts, hexylcyclohexanoic acid ammonium salts, dodecyclohexanoic acid ammonium salts, dibutylcycloheptanoic acid ammonium salts, pentylcycloheptanoic acid ammonium salts, cyclooctanoic acid ammonium salts, propylbenzoic acid ammonium salts, hexylbenzoic acid ammonium salts, octylbenzoic acid ammonium salts, dodecylbenzoic acid ammonium salts, stearylbenzoic acid ammonium salts, dipropylbenzoic acid ammonium salts, dibutylbenzoic acid ammonium salts, dihexylbenzoic acid ammonium salts, methyl dodecylbenzoic acid ammonium salts, ethyl stearylbenzoic acid ammonium salts, methylnaphthoic acid ammonium salts, ethylnaphthoic acid ammonium salts, propylnaphthoic acid ammonium salts, butylnaphthoic acid ammonium salts, hexylnaphthoic acid ammonium salts, heptylnaphthoic acid ammonium salts, octylnaphthoic acid ammonium salts, dodecylnaphthoic acid ammonium salts, stearylnaphthoic acid ammonium salts, dipropylnaphthoic acid ammonium salts, dibutynaphthoic acid ammonium salts, dihexylnaphthoic acid ammonium salts, methyl dodecylnaphthoic acid ammonium salts, and the like, as well as isomers and mixtures thereof.

The ammonium group (i.e., $NR_1R_2R_3R_4$ as above) of the aforementioned examples of carboxylic acid ammonium salts may be a substituted or unsubstituted ammonium group. For illustration purposes, some examples of the carboxylic acid ammonium salts with a substituted ammonium group include, but are not limited to, formic acid methylammonium salts, acetic acid pentylammonium salts, propionic acid dipropylammonium salts, hexanoic acid triethylammonium salts, heptanoic acid 2-hydroxethylammonium salts, octanoic acid bis(2-hydroxyethyl) ammonium salts, decanoic acid methylammonium salts, decanoic acid dimethylammonium salts, decanoic acid trimethylammonium salts, decanoic acid tri(2-hydroxyethyl) ammonium salts, dodecanoic acid methylammonium salts, dodecanoic acid dimethylammonium salts, dodecanoic acid trimethylammonium salts, myristic acid methylammonium salts, stearic acid methylethylammonium salts, stearic acid dimethylammonium salts, stearic acid trimethylammonium salts, stearic acid methylpiperidinium salts, oleic acid methylammonium salts, oleic acid morpholinoammonium salts, palmitic acid methylammonium salts, palmitoleic acid methylammonium salts, fatty acid ethylammonium salts, cyclohexanoic acid dibutylammonium salts, hexylcyclohexanoic acid trimethylammonium salts, dodecylhexanoic acid methylammonium salts, dibutylcycloheptanoic acid methylethylammonium salts, pentylcycloheptanoic acid dimethylammonium salts, cyclooctanoic acid propylammonium salts, propylbenzoic acid triethylammonium salts, hexylbenzoic acid trimethylammonium salts, octylbenzoic acid methylammonium salts, dodecylbenzoic acid piperidinoammonium salts, stearylbenzoic acid methylammonium salts, dipropylbenzoic acid 3-hydroxpropylammonium salts, dibutylbenzoic acid ethylpropylammonium salts, dihexylbenzoic acid methylammonium salts, methyl dodecylbenzoic acid ethylammonium salts, ethyl stearylbenzoic acid 2-hydroxyethylammonium salts, and the like, as well as isomers and mixtures thereof.

The term "alkyl" refers to the saturated aliphatic groups, including straight-chain alkyl groups, branched-chain alkyl groups, cycloalkyl (alicyclic) groups, alkyl substituted cycloalkyl groups, and cycloalkyl substituted alkyl groups. A straight chain or branched chain alkyl group advantageously has 30 or fewer carbon atoms in its backbone (e.g., $C_1$–$C_{30}$ for straight chain, $C_3$–$C_{30}$ for branched chain). Likewise, preferred cycloalkyls have from about 3–12 carbon atoms in their ring structure, and more preferably have 5–10 carbon atoms in the ring structure. The term "lower alkyl" refers to alkyl groups having from 1 to about 10 carbons in the chain, and to cycloalkyls having from about 3 to about 10 carbons in the ring structure.

Moreover, the term "alkyl", including "lower alkyl", as used throughout the specification and claims is intended to include both "unsubstituted alkyls" and "substituted alkyls", the latter of which refers to alkyl moieties having substituents replacing a hydrogen on one or more carbons of the hydrocarbon backbone. Such substituents can include, for example, halogens preferably excluding fluorine, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, azido, heterocyclyl, arylalkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "arylalkyl" moiety is an alkyl substituted with an aryl group (e.g., phenylmethyl (benzyl), etc.).

The term "heterocyclic group" is intended to include closed ring structures in which one or more of the atoms in the ring is an element other than carbon, for example, nitrogen, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CN, or the like.

The term "aromatic group" is intended to include unsaturated cyclic hydrocarbons containing one or more rings. Aromatic groups include 5- and 6-membered single-ring groups which may include from about zero to four heteroatoms, for example, groups derived from benzene (phenyl), pyrrole (pyrrolyl), furan (furanyl), thiophene (thiophenyl), imidazole (imadazolyl), oxazole (oxazolyl), thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CN, or the like.

The ink jet inks of the present invention, comprising anti-intercolor bleed agents such as the aforementioned ammonium salts of the organic phosphoric acid, phosphonic acid, sulfonic acid, and carboxylic acid, can form hydrophobic layers near its image boundary with another ink on a substrate, either with or without being heated, thus preventing undesired mixing of two neighboring inks which can form inter-color bleed. Heating of an ink comprising, e.g., at least one of the ammonium salts of organic phosphoric acid, phosphonic acid, sulfonic acid, and carboxylic acid in a printhead or on a substrate can thermally decompose the ammonium salt to give a less water soluble or compatible organic phosphoric acid, phosphonic acid, sulfonic acid, and carboxylic acid and form a hydrophobic barrier near the border areas of two inks resulting in reduction of inter-color bleed. The inks of the present invention also exhibit reduced drying time due to the hydrophobic nature of the R group and reduced image defects, as well as providing uniform ink image on transparencies and papers. The hydrophilic acid functional group of the organic phosphonic acid, sulfonic acid, and carboxylic acids (e.g. $RCO_2H$) can interact or react with hydroxyl groups of a substrate (e.g., paper, fibers, etc.), while the hydrophobic functional hydrocarbon group can reside on the surface of the substrate. The ink jet inks of the present invention also can have improved smear resistance and waterfastness, due to the hydrophobic organic phosphonic acid, sulfonic acid, and carboxylic acid formed on the imaged areas of a substrate.

The organic acid salts of the anti-intercolor bleed agents (Formula (I)) allow the materials to be ionized in water to provide the needed water compatibility in ink jet inks. The alkyl or cyclic alkyl groups in Formula (I) are hydrophobic and capable of providing low surface tension to an ink jet ink for good wetting on a substrate and for the ink to be dried quickly soon after its printing. The functional groups of the anti-intercolor bleed agents in an ink jet ink may also serve as a barrier on a substrate for preventing undesired ink mixing near the border areas between two printing inks. This is particularly true when one of the neighboring inks that does not have a low surface tension is printed onto a substrate next to an ink of this invention. As a result, inter-color bleed between the ink comprising the anti-intercolor bleed agent of this invention and another ink is reduced or minimized. Since the functional groups of the anti-intercolor bleed agent in the ink are hydrophobic, they provide beneficial wet smear resistance for the printed images after drying.

The ink-compatible anti-intercolor bleed agents of the invention may be added to ink jet ink compositions in an effective amount to prevent or reduce inter-color bleed or smear, e.g., generally in a concentration from about 0.001% to about 10% by weight, preferably less than about 7%, and more preferably less than about 5%. The ink compatible anti-intercolor bleed agents of this invention can provide ink jet ink compositions with low surface energy property and fast drying character and also exhibit hydrophobic or autophobic characteristics on substrates (or print substrates) or reducing inter-color bleed and smear.

The agents illustrated by Formula (I) are typically ionized in aqueous medium, i.e., A and X dissociate for the most part. In nonaqueous media the salt is typically present, i.e., A and X do not dissociate for the most part. It should be understood that where ionic forms of the agent(s) are presented herein, the nonionic forms (salts) are intended to be included as well.

The ink compatible anti-intercolor bleed agents of this invention can provide ink jet ink compositions with low surface energy property and fast drying character and also exhibit hydrophobic or autophobic characteristics on substrates for reducing inter-color bleed and smear.

In an embodiment of the invention, a first ink comprising the anti-intercolor bleed agent of this invention, which may be a black ink such as a carbon black ink or a black dye ink can be used when it is printed on a substrate to produce sharp edge acuity next to a second ink, such as a color ink such as a yellow (Y), or cyan (C), or magenta (M) ink, which may be a fast dry ink, and which usually has a surface tension of less than about 40 dynes/cm. The substrate may be heated or unheated. Alternatively, a first ink, which may be a color ink such as a yellow ink, comprising the anti-intercolor bleed agent of this invention can also be used when it is printed on a substrate next to a second ink, such as a black ink like a carbon black or a black dye ink, with sharp edge acuity. Again, the substrate may be heated or not. Desirably the first ink has a surface tension of less than about 45 dynes/cm and the second ink has a surface tension of 25–72 dynes/cm, or alternately the first ink has a surface tension of less than about 45 dynes/cm and the second ink has a surface tension of $\geq 45$ dynes/cm.

In a particularly advantageous embodiment, ink jet ink compositions are used which comprise a water-compatible anti-intercolor bleed agent that is a ammonium salt and wherein the imaging substrate is heated at any stage of ink jet printing process including before, during, and after the printing as well as combinations thereof (before and/or during and/or after printing). The ammonium cation is desirably an ammonium compound of the general formula (Formula (II))

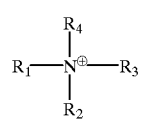

(Formula (II))

wherein $R_1$, $R_2$, $R_3$, and $R_4$ are independently selected from hydrogen, lower alkyl group (e.g., methyl, ethyl, propyl, butyl, pentyl, hexyl, etc.), and lower hydroxyalkyl groups (e.g., hydroxyethyl, hydroxypropyl, hydroxybutyl, etc.), e.g., $NH_4^+$, or $NCH_3H_3^+$. Where $R_1$, $R_2$, $R_3$, or $R_4$ are alkyl, any two or three may be cyclized, e.g., $R_1$ and $R_2$ connected to form a cyclic ring. Desirably, the ammonium compound comprises less than about 30 carbon atoms.

Heating the substrate in the ink jet printing process (including before, during, and after the printing as well as combinations thereof) enhances the anti-intercolor bleed properties of the ink, leading to improved image quality. Without wishing to be limited by theory, it is believed that ammonium salts of the anti-intercolor bleed agents can be thermally decomposed, either in the thermal ink jet printhead or on a heated print substrate, to give ammonia or amines and the corresponding acid, the latter of which has reduced water solubility or compatibility. The formation of the acid with reduced water solubility or compatibility onto a print substrate in the ink jet printing process is believed to provide a more hydrophobic barrier for the ink near its image boundary with another ink on a substrate (preferably heated), thus preventing undesired mixing of two neighboring inks which can form inter-color bleed. Heating of such an ink in a printhead or on a substrate is believed to thermally decompose the ammonium salt to give a less water-soluble or compatible acid and form a hydrophobic barrier near the border areas of two inks, resulting in reduction of inter-color bleed.

The ink jet ink compositions comprising the materials of the Formula (I) of the present invention consist of a hydrophobic functional group (e.g., R and/or G groups) of an acid salt such as a metal salt, which, upon printing onto a heated or unheated substrate can also provide a hydrophobic barrier near the border areas of two inks, resulting in reduction of inter-color bleed. The inks of the present invention also exhibit reduced drying time, possibly due to, it is believed, the hydrophobic nature of the R and/or G groups, and reduced image defects, as well as providing uniform ink image on transparencies and papers. The hydrophilic acid functional group of the materials of the Formula (I) is believed to interact or react with hydroxyl groups of a substrate (e.g., paper, fibers, etc.), while the more hydrophobic R and/or G groups reside on the surface of the substrate. The ink jet inks of the present invention also can have improved smear resistance and waterfastness.

In an ink jet printing process the first ink, which may be a color ink (such as Cyan, Magenta, or Yellow ink) comprising the anti-intercolor bleed agent can be printed first, to form a low surface energy hydrophobic barrier on a substrate after printing. Therefore, the low surface energy hydrophobic barrier can be generated by the anti-intercolor bleed agents in the first ink on the surface of a print substrate, preventing the undesired mixing between the first ink and the second ink subsequently printed next to the first ink to avoid inter-color bleed. In this case, the color ink is printed first, followed by the subsequent printing of a black ink with or without heating the substrate. The black ink can be a pigment-based ink such as a carbon black ink, or a dye-based ink.

In another ink jet printing process, a first ink, which may be a black dye- or pigment-based black ink, comprising an anti-intercolor bleed agent can form a low surface energy hydrophobic barrier on a substrate after printing. Therefore, the low surface energy hydrophobic barrier can be generated by the anti-intercolor bleed agents in the first ink on the surface of a print substrate, preventing undesired mixing between the first ink and the second ink to avoid inter-color bleed. In this case, the black ink is printed first, followed by printing of a color ink (second ink), with or without heating the substrate.

As described earlier, the anti-intercolor bleed agents of the present disclosure can also be employed in a color ink and used in conjunction with a black ink or color ink, which may or may not contain the anti-intercolor bleed agents, to reduce inter-color bleed. In this case, the color ink comprising the anti-intercolor bleed agents of this invention is preferably printed first followed by a second dye-based or pigment-based black ink. In a multi-color ink jet printing process, the printing can be carried out in any desired ink printing sequence or order with optional heating of the substrate, provided the objective of this invention is achieved.

In an embodiment of the invention, a multiple pass printing mode, such as a checkerboard mode, or a single pass ink jet printing process can be employed with any desired ink printing sequence or order to achieve a desired printing speed. For example, the ink printing sequence can be selected from a group consisting of a) K(black), C(cyan), M(magenta), Y(yellow); b) K, C, Y, M; c) K, M, C, Y; d) K, M, Y, C; e)K, Y, C, M; f)K, Y, M, C; g) Y, C, M, K; h) Y, M, C, K; i) Y, C, K, M; j) Y, M, K, C; k) Y, K, C, M; 1) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; w) M, C, K, Y; x) M, K, Y, C; and z) M, K, C, Y; wherein one ink must contain at least one of the anti-inter-color bleed agents to control inter-color bleed. Some of the preferred ink printing sequences include, without limitation, cases a), c), g), and h), where the longest time intervals between printing the yellow and the black ink are possible for the reduction of inter-color bleed. The preferred ink printing sequence is selected also because inter-color bleed between the black and yellow images is easier to be detected by eyes due to higher color contrast. Longest time intervals between printing the yellow and the black ink would allow one of the inks to be adequately dried before the next ink is deposited near to it. Thus, possible ink diffusion between the black and yellow inks is minimized on a substrate for the reduction of high contrast inter-color bleed. If desired reduction of inter-color bleed between two different color inks is required, then the printing sequence or order can be adjusted accordingly to achieve the objective. Ink printing sequences other than the preferred cases as mentioned above can also be used.

In another embodiment, each color ink (e.g., cyan, magenta, and yellow) in a multi-color ink jet printer can comprise any one of the desired anti-intercolor bleed agents of this invention in a favorable concentration and used to print on a substrate next to a black ink which may or may not have an anti-intercolor bleed agent of the present disclosure. Sometimes it is preferred to print a pigment ink, such as a carbon black ink, along with the color inks wherein at least one of inks comprises an anti-intercolor bleed agent, in a multi-color ink jet printing process. In this case, the carbon black ink usually is preferred to be able to produce a high quality image (sharp line, text, and graphic) on substrates such as plain and coated papers, and ink jet transparencies. The color inks comprising the anti-intercolor bleed agent(s) can quickly penetrate into papers and dry very fast, resulting in low inter-color bleed and smear.

In another embodiment, any one of the color ink jet inks (e.g., cyan, magenta, yellow) in a multi-color ink jet printing process can comprise the anti-intercolor bleed agent. If necessary, a plurality of the inks used (e.g., black and color) can also comprise the anti-intercolor bleed agents in the ink jet ink compositions to reduce intercolor bleeding or drying problems.

The above ink jet printing processes which use the inks of the present invention can be carried out either with or without heating the substrate during ink jet printing. The substrate can be heated at any stage of the ink jet printing process including before, during, and after printing as well as combinations thereof (before and/or during and/or after printing). Conventional heating methods such as radiant heating, lamp or light heating, microwave heating, heated drum, heated platen, heated belt, hot air, and heated roller can be employed. Heating the substrate during printing is particularly useful to produce high quality images with very low or no intercolor bleeding, especially when ammonium salts of the anti-intercolor bleed agents of the invention are used, as noted above.

The anti-intercolor bleed agents can also be used to help ink drying and the formation of uniform image on papers or transparencies without mottle. Furthermore, it can also help in producing good ink jet images on transparencies, which can be difficult to obtain.

Ink jet inks of the present invention may also optionally include any of the various known water miscible or soluble organic compounds as humectants or co-solvents. Suitable organic compounds (humectants or co-solvents) include, but are not limited to, glycol derivatives such as ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, polypropylene glycol, and the like; triols such as glycerine, trimethylolpropane, 1,3,5-pentanetriols, and 1,2,5-pentanetriols, 1,3,5-hexanetriols, and 1,2,5-hexanetriols; reaction products of all aforementioned glycols or triols with alkylethyleneoxides such as ethyleneoxide, propyleneoxide, and the mixture of ethyleneoxide and propyleneoxide; sulfoxide (e.g. dimethylsulfoxide); sulfone derivatives including sulfolane and dimethylsulfone; amides including N,N-dimethylforamide, N-methylacetamide, N,N-dimethylacetamide, caprolactam, 2-pyrrolidinone, and N-methylpyrrolidinone; N-hydroxyamides including N-acetylethanolamine, N-acetylpropanolamine, and N-hydroxyethylpyrrolidinone and the like; urea and its derivatives(ureas); inner salts including betaines; glycol ethers including carbitols (carbitol derivatives) including ethylcarbitol, propylcarbitol, butylcarbitol, cellusolve, and the like; polyglycolethers including alkylpolyethyleneglycol, alkylpolypropyleneglycol, dialkylpolyethyleneglycol, and dialkylpolypropyleneglycol; carboxylic acids and salts; alcohols including 1,3-propanediol, 1,4-butanediol, 1,5-pentanediol, 1,6-hexanediol, n-hexanol, n-petanol, n-butanol, n-propanol, isopropanol, ethanol, methanol, and the like; thio derivatives of the aforementioned hydroxyl containing compounds; amino alcohols; isomers of the aforementioned materials; and their mixtures thereof. Many other known humectants in the art of ink jet inks can also be employed.

The ink jet inks of the present invention include both fast drying and slow drying inks. The slow drying inks generally have a surface tension which is equal to or greater than about 45 dynes/cm, and generally in the range of 45 dynes/cm to 72 dynes/cm. The slow drying inks tend to give good edges and sharp images on plain papers with a slow printing speed. Fast drying inks generally have a surface tension less than about 45 dynes/ cm. The fast drying inks are capable of printing at a fast speed but in some cases with a slightly inferior print quality. However, there are some exceptions. Fast drying inks can comprise a penetrant that will increase ink drying speed. The penetrant gives the fast drying ink a lower surface tension, usually less than about 45 dynes/cm and preferably less than about 40 dynes/ cm. Preferably, the fast drying ink jet inks have a surface tension of from about 22 to about 45 dynes/cm, and more preferably from about 22 to about 40 dynes/cm. The inks comprising anti-intercolor bleed agents of this invention can also be used as a penetrant to provide a desired ink surface tension for ink drying. The inks comprising the anti-intercolor bleed agents of this invention can have a surface tension less than 45 dynes/cm at room temperature. The viscosity of the inks at 25° C. is usually less than about 20 cps (centipoises), preferably from about 1 cp to about 10 cps, and more preferably from about 1 cp to about 5 cps.

Penetrants suitable for use in the present invention include, but are not limited to, hydroxyether derivatives, including alkylcellusolves, propyleneglycol butyl ether, dipropyleneglycol butyl ether, tripropyleneglycol methyl ether, and the like, and alkylcarbitols such as hexylcarbitol, butylcarbitol and the like, polyethyleneglycol ether derivatives (e.g., one or two hydroxyl group(s) of polyethyleneglycol is replaced by a functional group such as methyl, ethyl, propyl, butyl, pentyl, hexyl, dodecyl, lauryl, stearyl, phenyl, alyklphenyl (e.g., octylphenyl, nonylphenyl and the like)); and polypropyleneglycol ether derivatives (e.g., one or two hydroxyl group(s) of polyethyleneglycol is or are replaced by a functional group such as methyl, ethyl, propyl, butyl, pentyl, hexyl, dodecyl, lauryl, stearyl, phenyl, alyklphenyl); alcohol derivatives (e.g., methanol, ethanol, isopropanol, butanol, pantanol, hexanol, octanol, and the like as well as their isomers); alkyl and cyclic amide derivatives including hexanoic acid amide, octanoic acid amide, N-cyclohexylpyrrolidinone, N-hexylpyrrolidinone, N-ethylpyrrolidinone, and the like; various surfactants having hydrophobic and hydrophilic moieties in the molecule including nonionic, cationic, and anionic types surfactants; mixtures thereof; and the like.

The ink jet inks of the present invention also can comprise a colorant. The colorant can be selected from any of the suitable colorants known in the art and preferably is either an anionic or cationic dye or a pigment or a mixture of a dye and pigment. The pigment may be present with or without a dispersing agent. For example, chemically modified pigments that have water compatible or ionized functional group(s) on the pigment particle surface such as anionic carboxylate, phorsphorate, phosphonate, and sulfonate group(s) as well as cationic ammonium group(s) can be dispersed in aqueous inks either with or without a dispersing agent. If it is desired, the chemically modified (or unmodified) pigments can also be used in conjunction with a pigment dispersant. An example of chemically modified pigments is shown in U.S. Pat. No. 5,281,261 by Lin, the disclosure of which is totally incorporated herein by reference. Some commercially available pigment dispersions that comprise chemically modified pigments include, but not limited to, Cab-O-Jet® carbon black dispersions from Cabot Chemical Co. and Bonjet® carbon black dispersions from Orient Chemical Co. of Japan. Those chemically modified pigment dispersions can be employed in ink jet ink compositions of the present invention. In addition, the colorant may, in embodiments, be a mixture of one or more pigments and/or dyes. The color of the mixed pigments and/or dyes can be used to provide desired color gamut and hue of ink jet images.

In embodiments where dyes are used, the dye is present in the ink jet ink in any effective amount to provide a desired color. Typically the dye (solid dye content) is present in an amount of from about 0 to about 20% by weight of total ink weight, and preferably from about 0.1 to about 10% by weight of total ink weight, although the amount can be outside this range. If a dye-containing solution is used in ink formulations then a higher weight percentage of dye solution is needed in order to provide the required amount of solid dye content. A mixture of dyes in the different proportions can be employed to obtain a desired shade. Similarly, in embodiments where pigments are used, the pigment may be present in the ink jet ink in any effective amount to provide needed color strength. Typically the pigment (solid pigment content) is present in an amount of from about 0 to about 15% by weight of total ink weight and preferably from about 0.1 to about 10% by weight of total ink weight, and more preferably from 1 to about 8% by weight of total ink weight, although the amount can be outside of this range. Where both dyes and pigments are incorporated into the ink jet ink composition, the weight percentage of the combined colorant may be adjusted accordingly.

The ink compositions of the present invention can comprise a colorant such as water soluble or dispersible dyes including anionic and cationic dyes. Those dyes can be Basic, Acid, Direct, Cationic, Anionic, and Reactive dyes. Examples of suitable dyes include, but are not limited to, Food Black No. 1, Food Black No. 2, Food Red No. 40, Food Blue No. 1, Food Yellow No. 7, and the like; FD & C dyes; Acid Black dyes (Nos. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 227, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes, monoazo dyes, diazo dyes, phthalocyanine derivatives, including various phthalocyanine sulfonate salts, aza annulenes, formazan copper complexes, triphenodioxazines, Bernacid Red 2BMN; Pontamine Brilliant Bond Blue A; Pontamine; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon, Basacid Black X34 (BASF X-34), available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; various Reactive dyes, including Reactive Black dyes, Reactive Blue dyes, Reactive Red dyes including Reactive red 180, and the like, Reactive Yellow dyes including Reactive yellow 37, as well as mixtures thereof.

The pigments can be black, cyan, magenta, yellow, red, blue, green, brown, and the like, as well as mixtures thereof. Examples of suitable pigments include, but are not limited to, various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® (Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen® Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal® Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol® Rubine Toner (Paul Uhlich), Lithol® Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen® Red 3340 (BASF), and Lithol® Fast Scarlet L4300 (BASF). Other useful pigments can also be selected. The pigments of the present invention may be stabilized in ink jet compositions by employing a pigment dispersant which can be selected from anionic, cationic, and nonionic pigment dispersants, as well as mixtures thereof. The pigments of the present invention may also be chemically modified and stabilized by their attached functional groups such as carboxylic acid salts, sulfonic acid salts, phosphoric acid salts, phosphonic acid salts, and substituted or unsubstituted ammonium salts.

The preferred pigments for the ink jet inks of the present invention are nontoxic and AMES test (a mutagenic test) negative materials that include nonmutagenic and noncarcinogenic pigments for safety reasons. For example, it is often desirable to have dyes and pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Raven® 5250, Raven® 5750, Regal® 330, Black Pearl® 1300, Black Pearls L, Vulcan®

XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in a thermal ink jet printer. Preferred particle average diameters are generally from about 0.001 to about 10 $\mu$m, although the particle size can be outside these ranges in embodiments. A preferred average pigment particle size in the inks of the present invention includes particles having at least 50% of the particles being below about 0.3 $\mu$m with no remaining particles being greater than about 3.0 $\mu$m (measured by a Particle Size Analyzer). More preferably, the average pigment particle size includes particles having at least about 50% of the particles being below 0.3 $\mu$m with no remaining particles being greater than about 1.0–1.2 $\mu$m.

In embodiments of the present invention, the pigment may be dispersed in the ink with one or more dispersants. The dispersants can be anionic, cationic, and nonionic types. Some preferred dispersants are ionic dispersants that have both ionic (capable of ionization in water) and hydrophobic (affinity for pigments) moieties. Suitable dispersants include, but are not limited to, anionic dispersants, including polymers and copolymers of styrene sulfonate salts (such as $Na^+$, $Li^+$, $K^{++}$, $Cs^+$, $Rb^+$, substituted and unsubstituted ammonium cations, and the like) and naphthalene sulfonate salts, (such as $Na^+$, $Li^+$, $K^+$, $Cs^+$, $Rb^+$, substituted and unsubstituted ammonium cations, and the like); copolymers of unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) and an aldehyde derivative (such as alkyl aldehyde derivatives including formaldehyde, acetaldehyde, propylaldehyde, and the like), polymers and copolymers comprising acrylic acid salts, or methacrylic acid salts, or maleic acid salts, or the like, and mixtures thereof. They can be added to an ink either in solid form or water solutions. Examples of such dispersants include commercial products such as Versa® 4, Versa® 7, Versa® 77 (National Starch and Chemical Co.); Lomar® D (Diamond Shamrock Chemicals Co.); Daxad® 19, Daxad® K (W. R. Grace & Co.); Tamol® SN (Rohm & Haas); and the like. Some of the preferred dispersants comprise naphthalene sulfonate salts, especially a condensation or reaction products of naphthalenesulfonic acid and formaldehyde, and its salts (such as $Na^+$, $Li^+$, $K^+$, $Cs^+$, $Rb^+$, substituted and unsubstituted ammonium cations, and the like) as well as polymers and copolymers comprising various carboxylic salts. Also, nonionic dispersants or surfactants can be used in ink jet inks of the present invention, such as ethoxylated monoalkyl or dialkyl phenols including Igepal® CA and CO series materials (Rhone-Poulenc Co.); and Triton® series materials (Union Carbide Company). These nonionic surfactants or dispersants can be used alone or in combination with the aforementioned anionic or cationic dispersants. Useful cationic dispersants of the present invention generally comprise substituted and unsubstituted ammonium salts.

The ink jet inks of the present invention may optionally comprise a water soluble or miscible microwave coupler which can be ionic or nonionic type. The nonionic type may include, but not limited to, various alcohol derivatives, hydroxyamide derivatives and their oxyalkylene reaction products which can be used in ink jet inks to couple with the microwave dryer for effective drying of images on papers and the reduction of smear and inter-color bleed.

Those hydroxyamide derivatives and their condensation products with alkyleneoxides (oxyalkylenes) can function as humectants, anti-curl agents, and/or microwave couplers. They can be used in ink jet inks either with or without an ionic type microwave coupler.

The ionic type microwave coupler can be selected from an organic or inorganic salt that allows an ink to be dried quickly by a microwave-heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device. These ionic compounds typically include metal and ammonium salts of inorganic and organic acids with cations and anions. Typical cations of salts include, but are not limited to, $H^+$, $NH_4$, $Cs^+$, $K^+$, $Na^+$, $Li^+$, $Fr^+$, $Ca^{+2}$, $Mg^{+2}$, $Zn^{+2}$, $Ni^{+2}$, $Mn^{+2}$, $Co^{+2}$, $Sr^{+2}$, $Cd^{+2}$, $Ba^{+2}$, $Fe^{+2}$, $Cu^{+2}$, $Ga^{+3}$, $In^{+3}$, $Cr^{+3}$, $Pr^{+3}$, $Nd^{+3}$, $Y^{+3}$, $Al^{+3}$, $Fe^{+3}$, lanthanide cations, actinide cations, and the like. The anions of those salts include, but are not limited to, inorganic and organic anions such as $I^-$, $Br^-$, $Cl^-$, $F^-$, $OH^-$, $NO_3^-$, $SO_4^{2-}$, $CH_3CO_2^-$, $CH_3CH_2CO_2^-$, $C_6H_5CO_2^-$, $C_6H_5SO_3^-$, various ethylenediaminetetraacetic acid (EDTA) anions, and the like. Salts of monovalent and multivalent salts can also be used in ink jet inks for reduction of intercolor bleeding either through microwave heating of the images or chemical interaction with anionic type colorants such as anionic dyes, pigments stabilized with anionic dispersants, pigments with an anionic functional group on the surface, and the like, in a multi-color ink jet printing process.

The use of those salts are desirable when they are compatible with optional ink components of the present invention including water, hydroxyamide derivatives, sulfur-containing humectants such as sulfoxides and sulfones, or other humectants including glycol derivatives, polyethyleneglycols, polypropyleneglycols, and the like, colorants including dyes and pigments, and other ink additives. They are chosen so that they will not cause a latency or a jetting problem, especially for a high resolution printhead. In embodiments of the present invention, the salts of inorganic and organic acids with ionizable cations and anions in aqueous inks can be included in the ink jet inks in an amount of from about 0 to about 10% by weight of total ink weight, and preferably in an amount of from about 0 to about 5% by weight of total ink weight, although they can be outside this range.

The ink jet inks of the present invention may optionally include a jetting aid such as polyethyleneoxide. A preferred polyethyleneoxide is one having a weight-average molecular weight of about 18,500 at a concentration of about 0.001–1.0% by weight of inks, and preferably a concentration of less than about 0.8% by weight. The jetting aid provides smoother jetting or jetting with reduced jitter.

Other desired chemical additives including surfactants, water soluble polymers, pH buffers, biocides, chelating agents such as EDTA, and other known additives can also be optionally used in inks of the present invention. Such additives can generally be added to ink jet inks of the present invention in known amounts for their known purpose.

Surfactants or wetting agents can be added to the ink to control ink wetting and surface tension. These additives may be of the anionic or cationic or nonionic types. Suitable surfactants and wetting agents include, but are not limited to, Tamol SN®, Tamol LG®, and those of the Triton® series (Rohm and Hass Co.); those of the Marasperse® series and those of the Igepal® series (Rhone-Poulenc Co., formerly from GAF Co.); those of the Brij® Series (ICI America Inc.) including Brij® 30, Brij® 35, Brij®52, Brij® 56, Brij® 58, Brij® 72, Brij® 76, Brij® 78, Brij® 92, Brij® 96, and Brij® 98; those of Surfynol® Series (Air Product Co.); those of the Tergitol® series (Union Carbide Co.), and those of the Duponol® series (E.I. Du Pont de Nemours & Co.), sodium lauryl sulfate; sodium dodecyl sulfate; sodium octyl sulfate; Emulphor® ON 870 and ON 877 (GAF); Igepal® Series (Rhone-Poulenc Co.) surfactants including Igepal® CO-630, Igepal® CO-530, Igepal® CA-630, and Igepal® CA-530; Duponol Series (DuPont Co.) and the like; and other commercially available surfactants. These surfactants and wetting agents may be present in the inks in effective amounts, generally from about 0 to about 8% by weight of total ink weight, and preferably from about 0 to about 6% by weight of total ink weight, and more preferably from about 0 to about 4% by weight of total ink weight, although the amount can be outside these ranges.

Polymeric chemical additives can also be added to the ink jet inks of the present invention to enhance the viscosity of the ink. Suitable polymeric additives include, but are not limited to, water soluble polymers such as Gum Arabic, hydroxypropylcellulose, hydroxyethylcellulose, polyvinylpyrrolidinone, polyvinylether, starch, polysaccharides, polyethyleneimines being derivatized with ethylene oxide and propylene oxide, such as the Discole® series (DKS International); the Jeffamine® series (Texaco); and the like. Polymeric additives may be present in the ink jet inks of the present invention in amounts of from about 0 to about 10% by weight of total ink weight, preferably from about 0.001 to about 8% by weight of total ink weight, and more preferably from about 0.01 to about 5% by weight of total ink weight, although the amount can be outside these ranges.

Other optional additives for the ink jet inks of the present invention include biocides such as Dowicil 150, 200, and 75, benzoate salts, sorbate salts, Proxcel® (available from ICI), and the like. When used in inks, such biocides are generally present in an amount of from about 0 to about 10% by weight of total ink weight, preferably from about 0.001 to about 8% by weight of total ink weight, and more preferably from about 0.01 to about 4.0% by weight of total ink weight, although the amount can be outside these ranges.

Ink jet inks of the present invention may also include pH controlling agents or pH buffering agents. Suitable pH controlling agents include, but are not limited to, acids, bases, phosphate salts, carboxylate salts, inner salts with cation and anion in a molecule, sulfite salts, amine salts, and the like. When used in inks, such pH controlling agents are generally present in an amount of from about 0 to about 10% by weight of total ink weight, preferably from about 0.001 to about 5% by weight of total ink weight, and more preferably from about 0.01 to about 5% by weight of total ink weight, although the amount can be outside these ranges.

Other suitable chemical additives are chelating agents including EDTA (ethylene diamine tetraacetic acid), HEEDTA N-(hydroxyethyl)ethylenediaminetetracetate), NTA (nitrolacetate), DTPA (diethylenetriaminepentaacetic acid), and the like, as well as their salts, typically present in an amount of from about 0.001 to about 10% by weight of total ink weight and preferably from about 0.001 to 5% by weight of total ink weight, although the amount can be outside of these ranges.

The ink jet inks of the present invention possess good jetting performance and frequency when a high-resolution printhead (e.g., ≧300 spi) such as a 300 spi, 360 spi, 400 spi, 600 spi, 720 spi, 1200 spi, and 1440 spi printhead is employed. This would allow an ink jet ink to be jetted easily and requires less frequent ink spitting or printhead maintenance.

In addition, the ink jet inks of the present invention can have excellent long-term jetting stability (e.g., jetting greater than about $1 \times 10^7$ drops), thus, allowing the printhead or printbars to be used for a long period of time. This reduces the cost of ink jet printing operation and maintenance. The use of ink jet inks of the present invention also provides the capability of a fast speed ink jet printing (e.g., 50 pages per minute of multi-color ink jet printing) especially when partial-width or full-width array printheads are employed. The capability of fast speed multi-color ink jet printing of the present invention far exceeds that of the current state-of-the-art commercial multi-color ink jet printers.

The ink jet printing of the inks of the present invention can be carried out in a checkerboard or image-wise single pass method. Some ink jet printers such as desk-top printers employ mobile printhead(s). A mobile printhead typically comprises a plurality of closely arranged nozzles provided in a small printing area. Such a mobile printhead produces partial digital images (e.g., checkerboard printing method), which when combined form large recognizable images, by sliding along a guide and dispersing ink during each "pass" across a print substrate.

This type of ink jet printer usually is a slow speed desk top ink jet printer that is available in the current market. The mobile printhead may also comprise two or more butted printheads, such as a partial-width printhead, with increasing number of ink nozzles comprising, e.g., more than 384 nozzles per printhead, such as the one employed in a partial-width array ink jet printer. In this way, more ink can be delivered to a substrate in a single swath as it moves across the print substrate. This type of parfial-width ink jet printer will have a higher ink jet printing speed as compared to the aforementioned desk top ink jet printer with a single printhead per ink cartridge. In a multi-color ink jet printing process, several printheads (e.g., black, cyan, magenta, and yellow) and their corresponding inks can be mounted on a printhead holder and moved across the print substrate. Different color inks are dispersed onto a print substrate when they are moved relative to the print substrate or vice versa. Each color ink can also have its own dedicated printhead and cartridge.

Multi-color image can be obtained by repeated printing. Multi-color ink jet printing using the partial-width printheads (e.g., black, cyan, magenta, and yellow printheads with their corresponding inks) increases the printing speed of the checkerboard printing process.

These multi-color ink jet printing processes can employ a set of four or more ink jet inks where at least one of these inks comprises water, a colorant, and an anti-intercolor bleed agent of formula (I):

$$\{[(R)_m]_n\}_s(A)(X)_p \qquad (I)$$

wherein a) R is a $C_1$ to about $C_{10}$ lower alkyl group;

b) A is either an acid functional group selected from the group consisting of sulfonic acid ($-SO_3^-$), carboxylic acid ($-CO_2^-$), and phosphonic acid ($-HPO_3^-$, $-PO_3^{-2}$) functional groups, or a water compatible group comprising at least one alkyleneoxide moiety;

c) X is a cation selected from the group consisting of $Li^+$, $Na^+$, $K^+$, $Rb^+$, $Cs^+$, $Ag^+$, $Fr^+$, $Ca^{++}$, $Mg^{++}$, $Zn^{++}$, $Ba^{++}$, $Fe^{++}$, $Sr^{++}$, $Cd^{++}$, $Cu^{++}$, $Co^{++}$ $Sn^{++}$, or an ammonium group of the general formula

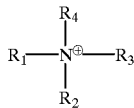

(II)

wherein $R_1$, $R_2$, $R_3$, and $R_4$ are independently hydrogen, lower alkyl group, or lower hydroxyalkyl groups when A is an acid functional group; or a hydrogen, amine, hydroxyl, or alkyl group when A is a water compatible group comprising at least one alkyleneoxide moiety; and d) m is a number in the range of about 1 to about 10, n is 1 or 2, p is 1 or 2, and s is 1 or 2.

Other faster ink jet printing such as a single pass ink jet printing or full-width array ink jet printing employs a full-width array printhead comprising a plurality of closely arranged nozzles and ejectors arranged across a width of a print substrate (an array of butted printheads extended to the width of a print substrate; for example, it can comprise more than several thousand ink jet nozzles per printhead). These nozzles can disperse ink without several time consuming passes of the printhead across the print substrate. The full-width array ink jet printheads are usually stationary in the printing process while the print substrate is passing through the printheads (single pass ink jet printing process). Many known full-with array ink jet printheads, processes, and their applications are described in U.S. Pat. Nos. 5,057,854; 4,985,710; 5,098,503; 5,192,959; and 5,432,539; the entire disclosures of which are incorporated herein by reference. In a multi-color ink jet printing process several full-width array printheads (e.g., black, cyan, magenta, yellow, etc.) can also be employed for printing inks onto a substrate. The ink jet ink compositions of the present invention can be employed in conjunction with a heating device (e.g. a heater or dryer, a microwave dryer or radiant heating device) to perform ink jet printing at a high speed (e.g., at least up to about 50 pages per minutes, about 10 inches per second paper speed) to produce high quality multi-color images on plain or coated papers without smear or inadequate drying.

In another embodiment of the present invention, the print substrate can be optionally heated at any stage of the ink jet printing process, i.e., before and/or during and/or after printing. The print substrate and inks can be optionally heated by various heating devices (heating means) known in the art, including without limitation, radiant heating, electric resistor heating, heating tape, hot plate, hot roller, microwave device, heated platen, radiation including heated lamp and desired light sources, and hot air. In the multi-color ink jet printing process of the present invention which preferably involves a set of at least four inks (e.g., black, cyan, magenta, and yellow inks), can print the first ink jet ink and the image of the first ink jet ink can be dried on the surface of the print substrate before the deposition of other inks near the border of the first ink jet ink. Alternatively, printing can be carried out by different inks and optionally heated at any stage of ink jet printing including before, during, and after printing as well as combinations thereof by a heating device. The ink jet inks can be dried quickly by a heating device as is known in the art, such as microwave dryers, radiant heaters, heated platens, heated rollers, heated belts, etc., to give excellent full color images without undesired smear or inter-color bleed.

The ink jet inks of the present invention may be applied to a suitable print substrate in an image-wise fashion, such as by using full-width array printheads. Application of the ink of the present invention to the print substrate can be made by any suitable printing process compatible with ink jet inks, such as continuous stream ink jet printing, drop-on-demand ink jet printing, including piezoelectric, acoustic, and thermal ink jet printing processes.

The print substrate employed in the present invention can be any substrate compatible with aqueous-based inks, including, but not limited to, plain papers, such as Xerox® series 10, Xerox® 4024, Japanese papers, HP Bright White, office papers, Recycled Bond paper, Domtar, Comwall-Ontario, Xerox Image Series LX, Hammermill Tidal DP, International Paper Selma, Al., Xerox 4024 DP, Rank Xerox, Premier ECF, Rank Xerox Premier TCF, Champion Brazil paper, Rank Xerox Business, Aussedat-Rey, Rank Xerox Exclusive, Rank Xerox Premier TCF, Nymolla, Xerox 4024, Cascade Xerographic paper, Spectrum DP, Husky Xerocopy, Xerox Image Elite, Fuji Xerox Paper, ink jet papers, commercial bond papers, and the like; coated papers (or special ink jet papers), such as those available from Hewlett-Packard, Canon, Oji Paper Co., and Xerox Corporation; and ink jet transparency materials suitable for aqueous inks or ink jet printing processes including those from Artright Co., Hewlett-Packard, Asahi Glass Co., Canon Co., and Xerox Corporation. Textile and other substrates can also be used as a print substrate if it is desired.

Aqueous ink jet inks of the present invention provide numerous benefits including low printing cost, high image resolution, excellent print quality on a variety of substrates, excellent jetting capability with good drop velocity, long latency, good drop mass or drop volume that provide optimal optical density, high frequency response to allow for high speed and high resolution printing, good printhead recoverability and maintainability, excellent ink jetting stability, and no undesired printhead kogation.

The ink jet inks of the present invention are capable of fast drying, to avoid inter-color bleed on plain papers, and the ink jet inks also can have reduced curl property. In addition, the ink jet inks can be jetted at high speed with partial-width ink jet printhead or full-width array ink jet printheads or printbars to give black or multi-color images at a speed of up to 50 pages per minute.

Specific embodiments of the present invention will now be described in detail. These Examples are intended to be illustrative only, and the invention is not limited to the materials, conditions or process parameters set forth in these embodiments. All parts and percentages are by weight in inks, unless otherwise indicated. Other embodiments and modifications of the present invention may occur to those skilled in the art subsequent to a review of the information presented herein; these embodiments and modifications, as well as equivalents thereof, are also included within the scope of the present invention.

EXAMPLE 1

A yellow ink (Y1) was prepared which comprises 51.63% PROJET Yellow OAM (7.5% Acid Yellow-23 dye solution), 14.4% Sulfolane (contains 5% water), 11.52% Acetylethanolamine, 11.52% Butylcarbitol, 6% Urea, 0.96% Imidazole, 0.096% Dowicil 150/200, 0.062% EDTA, 0.048% Polyethyleneoxide (Avg. MW=18.5K), and distilled water (balance). The ink was filtered through a 1.2 micron Nylon membrane filter and used as a reference or control.

EXAMPLE 2

A yellow ink (Y2) was prepared which comprises 51.63% PROJET Yellow OAM (7.5% Acid Yellow-23 dye solution), 14.4% Sulfolane (containing 5% water), 11.52% Acetylethanolamine, 11.52% butylcarbitol, 6% Urea, 0.96% Imidazole, 0.096% Dowicil 150/200, 0.062% EDTA, 0.048% Polyethyleneoxide (Avg. MW=18.5K), 4% Decanoic acid ammonium salt, and deionized water (balance). The salt was prepared by reacting the Decanoic acid with an equivalent amount of concentrated ammonia solution and dried at low temperature. The ink of this invention was filtered through a 1.2 micron Nylon membrane filter and used in inter-color bleed study.

EXAMPLE 3

Carbon black ink from a HP1200 C thermal ink jet printer was used for printing black line images on various plain papers alone or next to either the Y1 or Y2 inks (Examples 1 and 2) for the inter-color bleed studies. A Hewlett Packard 1200 C thermal ink jet printer was modified to disable the paper preheater and radiant heater functions during printing. After proper alignment, the ink jet printing was carried out at room temperature without heating the substrate. The Mid Frequency Line Edge Noise (MFLEN), is a measure of line sharpness of lines either alone or next to an adjacent ink; a low value means sharp line edge with good print quality (low inter-color bleed). The MFLEN data was measured to evaluate line sharpness in the border area between two ink images (e.g., lines of black ink next to yellow ink, etc.) for the inter-color bleed (ICB) study. MFLEN data were obtained by using a light source, a focused and calibrated camera equipped with an electronic sensor, a neutral filter, and proper software. The plain papers used for the ICB study in this invention comprise 1) Recycled Bond paper, Domtar, Cornwall-Ontario, 2) Xerox Image Series LX, 3) Hammermill Tidal DP, International Paper Selma, Al., 4) Xerox 4024 DP, 5) Rank Xerox, Premier ECF, 6) Rank Xerox Premier TCF, 7) Champion Brazil, 8) Rank Xerox Business, Aussedat-Rey, 9) Rank Xerox Exclusive, 10) Rank Xerox Priemer TCF, Nymolla, 11) Xerox 4024, 12) Cascade Xerographic paper, 13) Spectrum DP, 14) Husky Xerocopy, 15) Xerox Image Elite, and 16) Fuji Xerox Paper. The average value of MFLEN data for ICB were obtained and shown in Table I.

TABLE I

Inter-color Bleed data of Y1 and Y2 Yellow Inks Printed Next to HP 1200C Carbon Black Ink at Room Temperature

| Paper Type | ICB (MFLEN Data) Y1 Yellow Ink/ HP 1200 C Carbon Black Ink (Horizontal) | ICB* (MFLEN Data) Y2 Yellow Ink/ HP 1200 C Carbon Black Ink (Horizontal) | ICB (MFLEN Data) Y1 Yellow Ink/ HP 1200 C Carbon Black Ink (Vertical) | ICB* (MFLEN Data) Y2 Yellow Ink/ HP 1200 C Carbon Black Ink (Vertical) |
|---|---|---|---|---|
| Recycled Bond paper, Domtar | 34.8 | 17.3 | 71.3 | 31.4 |
| Hammermill Tidal DP | 50.7 | 38.5 | 36.9 | 30 |
| Xerox 4024 DP | 41 | 20.4 | 85.7 | 57.9 |
| Rank Xerox, Premier ECF | 39.8 | 35.3 | 46.2 | 35.5 |
| Rank Xerox Premier TCF | 15.6 | 14.3 | 45.9 | 28 |
| Champion Brazil | 52.7 | 38.1 | 79.8 | 43.3 |
| Average | 39.1 | 27.3 | 53.3 | 31.8 |

*Inter-color Bleed (ICB) Data of an ink of the present invention (Y2, Example 2) without heating the print substrate. Reduction of ICB was demonstrated.

EXAMPLE 4

Carbon black ink from a Hewlett Packard 1200 C thermal ink jet printer was used for printing black line images on various plain papers next to the Y2 ink for the inter-color bleed studies. The HP 1200 C thermal ink jet printer was employed without any modification. The printing was carried out in high quality/normal mode with the print substrates (papers) being heated by a paper preheater and a radiant heater in the printer during the ink jet printing process. The HP 1200 C carbon black ink and the Y2 Yellow ink (an ink pair) were also printed next to each other on various papers using the modified HP 1200 C Ink Jet Printer wherein the paper preheater and radiant heater functions were stopped during printing, i.e., the substrate was not heated (see the results in Table I). MFLEN data were recorded. The average value of MFLEN data for the black lines next to yellow inks were obtained and shown in Table II and compared with the inter-color bleed MFLEN data of the same ink pair without heating the substrates during the ink jet printing process. Table II shows the effect of heating the ink jet ink of this invention to achieve low inter-color bleed.

TABLE II

Inter-color Bleed data of Y1 and Y2 Yellow Inks Printed Next to
HP 1200C Carbon Black Ink With or Without the Heating of the Substrate

| Paper Type | ICB* (MFLEN Data) Y2 Yellow Ink/ HP 1200 C Carbon Black Ink (Horizontal) Heated Substrate | ICB (MFLEN Data) Y2 Yellow Ink/ HP 1200 C Carbon Black Ink (Horizontal) Unheated Substrate | ICB* (MFLEN Data) Y2 Yellow Ink/ HP 1200 C Carbon Black Ink (Vertical) Heated Substrate | ICB (MFLEN Data) Y2 Yellow Ink/ HP 1200 C Carbon Black Ink (Vertical) Unheated Substrate |
|---|---|---|---|---|
| Recycled Bond paper, Domtar | 0.2 | 17.3 | 0.8 | 31.4 |
| Hammermill Tidal DP | 2.7 | 38.5 | 2.5 | 30 |
| Xerox 4024 DP | 0.7 | 20.4 | 5.3 | 57.9 |
| Rank Xerox, Premier ECF | 2.5 | 35.3 | 2.3 | 35.5 |
| Rank Xerox Premier TCF | 1.9 | 14.3 | 2.6 | 28 |
| Champion Brazil | 2.7 | 38.1 | 3.5 | 43.3 |
| Average | 1.3 | 27.3 | 2.8 | 31.8 |

*Inter-color Bleed (ICB) Data of an ink of the present invention (Y2, Example 2) with the heating of both the ink and print substate during printing. Reduction of ICB was shown.

EXAMPLE 5

The Y2 Yellow Ink and HP 1200C Yellow Ink were printed with an unmodified HP 1200C printer next to the HP 1200C carbon black ink on various substrates (see Example 3 for the description of papers) with the printer's radiant heater and substrate preheater on Auto/Normal mode. The horizontal inter-color bleed data are shown in Table III. The ICB results in Table III indicate that on the average the Y2 yellow ink of this invention is slightly better than the HP 1200 C yellow ink when they were printed next to the HP 1200 C carbon black ink with the heated substrate (Avg.=1.5 vs. Avg.=2.1).

TABLE III

Intercolor Bleeding Data of HP 1200C Black (C.B.) Ink Next To Either Y2 Yellow Ink Comprising 4% DAAS or HP 1200C Yellow Ink

| Paper Type | Y2 Yellow Ink* Comprising 4% DAAS Horizontal ICB | HP 1200C Yellow Ink Horizontal ICB | Y2 Yellow Ink* Comprising 4% DAAS Vertical ICB | HP 1200C Yellow Ink Vertical ICB |
|---|---|---|---|---|
| Recycled Bond Paper, Domtar | 0.2 | 1.6 | 0.8 | 1.9 |
| Xerox Image Series LX | 0.1 | 0.1 | 0.4 | 0.7 |
| Hammermill Tidal DP | 2.7 | 6.1 | 2.5 | 7.9 |
| Xerox 4024 DP | 0.7 | 0.7 | 5.3 | 2.9 |
| Rank Xerox, Premier ECF | 2.5 | 1.0 | 2.3 | 4.6 |
| Rank Xerox Premier TCF | 1.9 | 4.0 | 2.6 | 12.2 |
| Champion Brazil | 2.7 | 0.9 | 3.5 | 1.9 |
| Xerox 4024 | 1.5 | 2.4 | 4.4 | 10.9 |
| Average | 1.5 | 2.1 | 2.7 | 5.4 |

*Yellow Ink (Y2) Comprising 4.0% Decanoic Acid Ammonium Salt (4% DAAS); HP-1200C Printer was used (High Quality Mode). Horizontal and vertical ICB data of this Invention.

EXAMPLE 6

A black ink (KD-1) was prepared comprising 17% BASF X-34 black dye concentrate solution (~15% dye solution), 20% ethyleneglycol, 1.5% $NH_4Cl$, 3% Direct red 227, 1.25% benzyl alcohol, and deionized water for balance. The black ink has a surface tension of 48.8 dyne/cm.

EXAMPLE 7

A yellow ink (Y3) was prepared comprising 27% PRO-JET Yellow dye solution (7.5% dye concentration), 20% Acid Yellow 17 dye concentrate (10% dye concentration), 12% Butylcarbitol, 15% sulfolane, 13% N-Acetylethanolamine, 0.05% Polyethyleneoxide (PEO, Avg. MW=18.5K), 0.05% Dowicil 150/200, and distilled water (balance). The yellow ink has a surface tension of 40 dyne/cm and dries faster than the black ink in Example 6.

EXAMPLE 8

A Xerox black ink printhead (600 spi resolution, stationary) and KD-1 black ink were placed in the upstream of the printing and paper (moving substrate) moving direction. A single pass ink jet printing method was employed. A Xerox color ink printhead (600 spi resolution, stationary) and Y3 yellow ink were placed in the downstream position at a distance of 13.5 inches away from the black printhead. The KD-1 black ink was printed first on a substrate and then the black ink image was dried by a heater (e.g. a microwave heater placed about midway between the black ink and yellow ink printheads (about 7–8" apart)) followed by printing the Y3 yellow ink next to the black ink. The speed of the paper transport and printing was about 4.33 inches per second, which provided a printing speed of about 23.6 pages/min, assuming the paper dimension of 8½"×11". The frequency of ink jetting was approximately 2600 Hz. The drop mass values for the black and yellow inks were 19.7 ng/drop and 10.2 ng/drop, respectively. One of the preferred ink jet printing processes of this invention, called Case I, prints a first ink (e.g., the black ink KD-1), followed by heating the substrate and the image of the first ink, then printing the second ink (e.g., the yellow ink, Y3). Sixteen papers were tested.

In a different ink jet printing process, Case II, the black ink printhead (600 spi resolution, stationary) and KD-1 black ink were placed upstream in the printing and paper (moving substrate) moving direction. A single pass ink jet printing method was employed. The yellow ink printhead (600 spi resolution, stationary) and Y3 yellow ink were placed in the downstream position at a distance of <1.5" away from the black ink printhead. The microwave heater was placed downstream from the yellow ink and its printhead at a distance of about 5 inches. The black ink was printed first on a substrate followed by the printing of the Y3 yellow ink (Example 6, second ink) next to the black ink and then heated (e.g. by a microwave device). The speed of the paper transport and printing was about 4.33"/second, which provided a maximum printing speed of 23.6 pages/min, assuming the paper dimension of 8½"×11". The frequency of ink jetting was approximately 2600 Hz. The drop mass values for the black and yellow inks were 19.7 ng/drop and 10.2 ng/drop respectively. The Case II ink jet printing process prints a first ink such as the KD-1 black ink, followed by printing the second ink such as the Y3 yellow ink, then heating the black and yellow images on the substrate. Sixteen papers were tested here as well.

The inter-color bleed data for the Cases I and II were obtained on various papers (3 T, 7 T, 10 NT to 23NT), and shown in Table IV. A preferred ink jet print process (Case I) of this invention was shown to give better inter-color bleed results than Case II. A fast ink jet printing process (at least 23 pages per minute) with high resolution (≧600 spi) was shown to give excellent print quality with low inter-color bleed.

TABLE IV

Comparison of Inter-color Bleed Data Between the Printing Processes of Case I and Case II

| Paper Type | Inter-color Bleed For Ink Jet Printing Process (Case I) KD-1/Y3 Pair | Inter-color Bleed For Ink Jet Printing Process (Case II) KD-1/Y3 Pair |
| --- | --- | --- |
| Recycled Bond paper, Domtar | 2.6 | 61.5 |
| Xerox Image Series LX | 1.8 | 29.6 |
| Hammermill Tidal DF | 23.2 | 19.2 |
| Xerox 4024 DP | 13.8 | 31.9 |
| Rank Xerox, Premier ECF | 19.9 | 38.1 |
| Rank Xerox Premier TCF | 4.4 | 29.7 |

TABLE IV-continued

Comparison of Inter-color Bleed Data Between the Printing Processes of Case I and Case II

| Paper Type | Inter-color Bleed For Ink Jet Printing Process (Case I) KD-1/Y3 Pair | Inter-color Bleed For Ink Jet Printing Process (Case II) KD-1/Y3 Pair |
| --- | --- | --- |
| Champion Brazil | 6.1 | 8.3 |
| Rank Xerox Business, Aussedat-Rey | 3.4 | 86.6 |
| Rank Xerox Exclusive | 8.3 | 33.5 |
| Rank Xerox Premier TCF | 6.4 | 32.9 |
| Xerox 4024 | 4.2 | 30.3 |
| Xerox 4024 | 15.9 | 48.8 |
| Spectrum DF | 16.2 | 16.3 |
| Husky Xerocopy | 21.4 | 19.7 |
| Xerox Image Elite | 8.0 | 44.5 |
| Fuji Xerox Paper | 35.6 | 27.4 |
| Average | 12.0 | 34.9 |

Note: Lower average ICB data in Case I indicates better print quality.

EXAMPLE 9

A black ink (KD-2) was prepared, comprising 17% BASFX-34 Black Dye solution (15% dye concentration), 3.0% Direct Red 227 (Sodium salt (gives Na cation)), 20% Sulfolane, 6% Trimethylopropane, 1.25% ammonium formate, 0.005% PEO (Avg. MW=18.5 K), 0.05% Dowicil 150/200, and distilled water (balance).

EXAMPLE 10

The KD-2 black ink and the Y3 yellow ink were used for an inter-color bleed (ICB) study in this Example. The same ink jet printing processes and papers described in Example 8 were also used in this Example, but the KD-1 ink was substituted by the KD-2 ink. The average ICB data for 16 papers for Cases I and II using the ink pair of KD-2 Black ink (first ink) and Y3 Yellow ink (second ink) are 17.1 (Case I) and 60.1 (Case II), respectively. The results indicate that the ink jet printing process (Case I) also gives better print quality than Case II as it was demonstrated in Example 8, and, as such, Case I is a preferred ink jet printing process.

Equivalents

Those skilled in the art will recognize, or be able to ascertain using no more than routine experimentation, numerous equivalents to the specific procedures described herein. Such equivalents are considered to be within the scope of the present invention and are covered by the following claims. The contents of all references, issued patents, and published patent applications cited throughout this application are hereby incorporated by reference. The appropriate components, processes, and methods of those patents, applications and other documents may be selected for the present invention and embodiments thereof.

What is claimed is:

1. An ink jet ink composition suitable for high resolution ink jet printing, comprising water, a colorant, and a water-soluble or an ink-compatible anti-intercolor bleed agent of the formula:

$$\{[(R)_m]_n\}_s(A)(X)_p \qquad (I)$$

wherein a) R is a $C_1$ to about $C_{10}$ lower alkyl group;

b) A is an acid functional group selected from the group consisting of sulfonic acid ($-SO_3^-$), carboxylic acid ($-CO_2^-$), and phosphonic acid ($-HPO_3^-$, $-PO_3^{-2}$) functional groups;

c) X is a cation selected from the group consisting of $Li^+$, $Na^+$, $K^+$, $Rb^+$, $Cs^+$, $Ag^+$, $Fr^+$, $Ca^{++}$, $Mg^{++}$, $Zn^{++}$, $Ba^{++}$, $Fe^{++}$, $Sr^{++}$, $Cd^{++}$, $Cu^{++}$, $Co^{++}$ $Sn^{++}$, or an ammonium group of the general formula

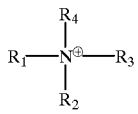

(II)

wherein $R_1$, $R_2$, $R_3$, and $R_4$ are independently hydrogen, lower alkyl group, or lower hydroxyalkyl groups when A is an acid functional group; and d) m is a number in the range of about 1 to about 10, n is 1 or 2, p is 1 or 2, and s is 1 or 2.

2. The ink jet ink composition of claim 1, wherein the said alkyleneoxide moiety is selected from the group consisting of ethyleneoxide, propyleneoxide, polyethyleneoxide, polypropyleneoxide, and mixture thereof.

3. The ink jet ink composition of claim 1, further comprising a humectant selected from the group consisting of glycols selected from the group consisting of ethylene glycol, propylene glycol, diethylene glycol, dipropylene glycol, triethyleneglycol, tetraethyleneglycol, pentaethyleneglycol, tripropyleneglycol, and tetrapropyleneglycol; polyglycols selected from the group consisting of polyethylene glycol, polypropylene glycol, and poly(ethyelenglycol-co-propyleneglycol); triols selected from the group consisting of glycerine, trimethylolpropane, 1,3,5-pentanetriols, 1,2,5-petanetriols, 1,3,5-hexanetriols, and 1,2,5-hexanetriols; reaction products of all aforementioned glycols or triols with alkylethyleneoxides selected from the group consisting of ethyleneoxide, propyleneoxide, and mixtures thereof; sulfoxides; sulfones selected from the group consisting of sulfolane and dimethylsulfone; amides selected from the group consisting of N,N-dimethylformamide, 2-pyrrolidinone, N-methylpyrrolidinone, N-methylacetamide, N,N-dimethylacetamide, and caprolactam; N-hydroxyamides selected from the group consisting of N-acetylethanolamine, N-acetylpropanolamine, and N-hydroxyethylpyrrolidinone; ureas; inner salts selected from the group consisting of betaines; glycol ethers selected from the group consisting of ethylcarbitol, propylcarbitol, butylcarbitol, and cellusolve; polyglycolethers; alcohols selected from the group consisting of 1,3-propanediol, 1,4-butanediol, 1,5-pentanediol, 1,6-hexanediol, n-hexanol, n-petanol, n-butanol, n-propanol, isopropanol, ethanol, and methanol; thiols of the aforementioned hydroxyl-containing compounds; amino alcohols; isomers of aforementioned materials; and mixtures thereof.

4. The ink jet ink composition according to claim 3, further comprising an additive selected from the group consisting of penetrants, biocides, surfactants, pigment dispersants, jetting aids, anti-bleed agents, pH buffering agents, chelating agents, water soluble polymers, anti-kogation agents, anti-curling agents, anti-cockle agents, microwave couplers, and combinations thereof.

5. An ink jet printing process comprising imagewise printing an ink jet ink composition comprising water, a colorant, and a water-soluble or an ink-compatible anti-intercolor bleed agent of the formula

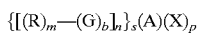

(I)

wherein a) R is a $C_1$ to about $C_{30}$ alkyl, alkenyl, alkynyl, or aryl group;

b) G is an aromatic group of about $C_6$ to $C_{10}$, or a cyclic alkyl group of about $C_3$ to about $C_{20}$;

c) A is either an acid functional group selected from the group consisting of sulfonic acid ($-SO_3^-$), carboxylic acid ($-CO_2^-$), and phosphonic acid ($-HPO_3^-$, $-PO_3^{-2}$) functional groups, or a water compatible group comprising at least one alkyleneoxide moiety;

d) X is a cation selected from the group consisting of $Li^+$, $Na^+$, $K^+$, $Rb^+$, $Cs^+$, $Ag^+$, $Fr^+$, $Ca^{++}$, $Mg^{++}$, $Zn^{++}$, $Ba^{++}$, $Fe^{++}$, $Sr^{++}$, $Cd^{++}$, $Cu^{++}$, $Co^{++}$ $Sn^{++}$, or an ammonium group of the general formula

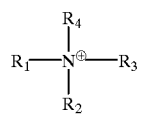

(II)

wherein $R_1$, $R_2$, $R_3$, and $R_4$ are independently hydrogen, lower alkyl group, or lower hydroxyalkyl groups when A is an acid functional group; or a hydrogen, amine, hydroxyl, or alkyl group when A is a water compatible group comprising at least one alkyleneoxide moiety; and m is a number in the range of about 1 to about 10, b is 0 or 1, n is 1 or 2, p is 1 or 2, and s is 1 or 2 and wherein said ink jet ink composition is a first ink which is printed on a substrate next to a second ink of a different color that has a sharp edge acuity.

6. The ink jet printing process of claim 5, wherein said first ink has a surface tension of less than about 45 dynes/cm and said second ink has a surface tension of 25–72 dynes/cm.

7. The ink jet printing process of claim 5, wherein said first ink has a surface tension of less than about 45 dynes/cm and said second ink has a surface tension of $\geq$45 dynes/cm.

8. The ink jet printing process of claim 5, wherein said first and second inks are dye-based or pigment-based inks independently selected from the group consisting of black, yellow, cyan and magenta inks.

9. The ink jet printing process of claim 5, wherein said first ink is a color dye-based ink which is selected from the group consisting of yellow, cyan, and magenta inks and said second ink is a carbon black ink or black dye ink.

10. The ink jet printing process of claim 5, wherein said first ink is a color ink is selected from the group consisting of yellow, cyan, and magenta inks, and said second ink is a color ink which is different from said first ink.

11. The ink jet ink composition of claim 5, wherein said water-soluble or ink-compatible anti-intercolor bleed agent is present in an effective amount to prevent or reduce inter-color bleed or smear, to a concentration of less than about 10% by weight of the ink jet ink composition.

12. The ink jet ink composition of claim 1, wherein the water-soluble or ink-compatible anti-intercolor bleed agent is present in an effective amount to prevent or reduce inter-color bleed or smear, to a concentration of less than about 5% by weight of the ink jet composition.

13. The ink jet ink composition of claim 1, wherein said colorant is selected from the group consisting of a chemically modified carbon black dispersion, a carbon black dispersion comprising a anionic, nonionic, or cationic pigment dispersant, and a dye which is selected from the group consisting of anionic dyes, cationic dyes, direct dyes, reactive dyes, and mixtures thereof.

14. An ink jet ink printing process comprising applying at least an ink jet ink composition according to claim 1 in any desired pattern onto a print substrate with an ink jet printhead in a single pass or a multiple pass method according to digital data signals.

15. The ink jet printing process of claim 14, wherein said printing process is conducted by at least one ink jet printhead selected from the group consisting of a single printhead, a partial-width printhead, and a full-width array printhead.

16. The ink jet printing process of claim 15, wherein said ink jet printhead has a resolution which is equal to or greater than about 300 spi.

17. A multi-color ink jet printing process comprising depositing a set of four or more multi-color ink jet inks by their corresponding printheads in any desired printing method and sequence according to digital signals onto a print substrate, wherein said set of multi-color ink jet inks has at least one ink jet ink composition which comprises water, a colorant, and a water-soluble or an ink-compatible anti-intercolor bleed agent of the formula:

  (I)

wherein a) R is a $C_1$ to about $C_{10}$ lower alkyl group;

b) A is either an acid functional group selected from the group consisting of sulfonic acid (—$SO_3^-$), carboxylic acid (—$CO_2^-$), and phosphonic acid (—$HPO_3^-$, —$PO_3^{-2}$) functional groups, or a water compatible group comprising at least one alkyleneoxide moiety;

c) X is a cation selected from the group consisting of $Li^+$, $Na^+$, $K^+$, $Rb^+$, $Cs^+$, $Ag^+$, $Fr^+$, $Ca^{++}$, $Mg^{++}$, $Zn^{++}$, $Ba^{++}$, $Fe^{++}$, $Sr^{++}$, $Cd^{++}$, $Cu^{++}$, $Co^{++}$ $Sn^{++}$, or an ammonium group of the general formula

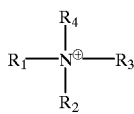  (II)

wherein $R_1$, $R_2$, $R_3$, and $R_4$ are independently hydrogen, lower alkyl group, or lower hydroxyalkyl groups when A is an acid functional group; or a hydrogen, amine, hydroxyl, or alkyl group when A is a water compatible group comprising at least one alkyleneoxide moiety; and d) m is a number in the range of about 1 to about 10, n is 1 or 2, p is 1 or 2, and s is 1 or 2.

18. The multi-color ink jet printing process of claim 17, wherein said printheads are independently selected from the group consisting of single printheads, partial-width printheads, and full-width array printheads and said printing process can be carried out at a speed of up to 50 pages per minute.

19. The multi-color ink jet printing process of claim 17, wherein said substrate is optionally heated at any stage of an ink jet printing process.

20. The multi-color ink jet printing process of claim 19, wherein said heating is carried out by a device selected from the group consisting of a radiant heater, a heated roller, a heated platen, a heated drum, a microwave drying device, a heated lamp, hot air, and combinations thereof.

21. The multi-color ink jet ink printing process of claim 17, wherein said ink jet printing process is selected from the group consisting of a continuous ink jet printing process and a drop-on-demand ink jet printing process.

22. The multi-color ink jet printing process of claim 21, wherein said ink jet printing process is carried out on a print substrate which can be optionally heated at any stage of ink jet printing.

23. The multi-color ink jet printing process of claim 17, wherein said sequence is selected from the group consisting of a) K (black), C (cyan), M (magenta), Y (yellow); b) K, C, Y, M; c) K, M, C, Y; d) K, M, Y, C; e) K, Y, C, M; f) K, Y, M, C; g) Y, C, M, K; h) Y, M, C, K; i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; w) M, C, K, Y; x) M, K, Y, C; and z) M, K, C, Y.

24. The multi-color ink jet printing process of claim 23, wherein said sequence is selected from the group consisting of a); c); g); and h).

25. A multi-color ink jet printing process comprising 1) printing a first ink jet ink onto a substrate, 2) heating said print substrate and the image of said first ink jet ink by a heating device, 3) printing a second ink jet ink of a different color from said first ink jet ink onto said substrate, and 4) optionally printing additional ink jet ink(s) of different color from said first and second ink jet inks onto said substrate either before or after said heating step, and said ink jet printing process is carried out in an image-wise fashion according to digital data signals in any desired printing sequence or order at a speed of up to 50 pages per minute, wherein one of said ink jet inks comprises water, a colorant, and a water-soluble or an ink-compatible anti-intercolor bleed agent of the formula:

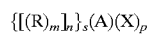  (I)

wherein a) R is a $C_1$ to about $C_{10}$ lower alkyl group;

b) A is either an acid functional group selected from the group consisting of sulfonic acid (—$SO_3^-$), carboxylic acid (—$CO_2^-$), and phosphonic acid (—$HPO_3^-$, —$PO_3^{-2}$) functional groups, or a water compatible group comprising at least one alkyleneoxide moiety;

c) X is a cation selected from the group consisting of $Li^+$, $Na^+$, $K^+$, $Rb^+$, $Cs^+$, $Ag^+$, $Fr^+$, $Ca^{++}$, $Mg^{++}$, $Zn^{++}$, $Ba^{++}$, $Fe^{++}$, $Sr^{++}$, $Cd^{++}$, $Cu^{++}$, $Co^{++}$ $Sn^{++}$, or an ammonium group of the general formula

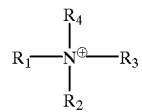  (II)

wherein $R_1$, $R_2$, $R_3$, and $R_4$ are independently hydrogen, lower alkyl group, or lower hydroxyalkyl groups when A is an acid functional group; or a hydrogen, amine, hydroxyl, or alkyl group when A is a water compatible group comprising at least one alkyleneoxide moiety; and d) m is a number in the range of about 1 to about 10, n is 1 or 2, p is 1 or 2, s is 1 or 2.

26. The multi-color ink jet printing process of claim 25 wherein said second ink jet ink is printed on a substrate in an area adjacent of said first ink jet ink.

27. The multi-color ink jet printing process of claim 25 employing a set of four or more ink jet inks and at least one of said four or more ink jet inks is an ink jet ink composition comprising water, a colorant, and an anti-intercolor bleed agent of the formula:

$$[R_d\text{—}CO_2^-]_sX \qquad (III)$$

wherein $R_d$ is a hydrogen, an alkyl group, an alkenyl group, an alkynyl group, or an aryl group with from about one to thirty carbon atoms; X is selected from the group consisting of
1) a cation selected from the group consisting of $H^+$, $Li^+$, $Na^+$, $K^+$, $Rb^+$, $Cs^+$, $Ag^+$, and $Fr^+$;
2) a multivalent cation selected from a group consisting of $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, and $Co^{++}$; and
3) an ammonium group of the general formula

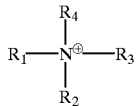

(II)

wherein $R_1$, $R_2$, $R_3$, and $R_4$ are independently selected from hydrogen, lower alkyl group and lower hydroxyalkyl groups; and s=1 or 2.

28. The multi-color ink jet printing process of claim 25 wherein said anti-intercolor bleed agent is represented by the following formula:

$$[R_dA]_sX$$

wherein s=1;

$R_d$ is a $C_5$ to about $C_{30}$ alkyl, alkenyl, alkynyl, or aryl group;

A is a water compatible group comprising at least one alkyleneoxide moiety selected from the group consisting of ethyleneoxide, propyleneoxide, polyethyleneoxide, and polypropyleneoxide, and mixtures thereof; and X is selected from the group consisting of hydrogen, amine, hydroxyl, and alkyl groups.

29. The multi-color ink jet printing process of claim 25, wherein said ink jet ink composition of claim 1 is a first ink jet ink of a color selected from the group consisting of K, C, M, and Y, said ink jet ink composition further selected from the group consisting of a dye-based inks and pigment-based ink jet inks.

30. The multi-color ink jet printing process of claim 25, wherein said second ink jet ink is an ink jet ink composition of claim 1 which is either a dye-based or pigment-based ink jet ink with a color selected from the group consisting of K, C, M, and Y.

31. The multi-color ink jet printing process of claim 25, wherein said ink jet ink composition of claim 1 is a first ink jet ink of any desired color other than black and is either a dye-based or pigment-based ink jet ink.

32. The multi-color ink jet printing process of claim 25 wherein said second ink jet ink is a black dye ink or a carbon black ink which comprises either a chemically modified pigment or a pigment dispersion stabilized by an anionic, cationic, or nonionic pigment dispersant.

33. The multi-color ink jet printing process of claim 27 wherein said anti-intercolor bleed agent is selected from the group consisting of formic acid ammonium salts, acetic acid ammonium salts, propionic acid ammonium salts, hexanoic acid ammonium salts, heptanoic acid ammonium salts, octanoic acid ammonium salts, decanoic acid ammonium salts, dodecanoic acid ammonium salts, myristic acid ammonium salts, stearic acid ammonium salts, oleic acid ammonium salts, palmitic acid ammonium salts, palmitoleic acid ammonium salts, fatty acid ammonium salts, cyclohexanoic acid ammonium salts, hexylcyclohexanoic acid ammonium salts, dodecyclohexanoic acid ammonium salts, dibutylcycloheptanoic acid ammonium salts, pentylcycloheptanoic acid ammonium salts, cyclooctanoic acid ammonium salts, propylbenzoic acid ammonium salts, hexylbenzoic acid ammonium salts, octylbenzoic acid ammonium salts, dodecylbenzoic acid ammonium salts, stearylbenzoic acid ammonium salts, dipropylbenzoic acid ammonium salts, dibutylbenzoic acid ammonium salts, dihexylbenzoic acid ammonium salts, methyl dodecylbenzoic acid ammonium salts, ethyl stearylbenzoic acid ammonium salts, methylnaphthoic acid ammonium salts, ethylnaphthoic acid ammonium salts, propylnaphthoic acid ammonium salts, butylnaphthoic acid ammonium salts, hexylnaphthoic acid ammonium salts, heptylnaphthoic acid ammonium salts, octylnaphthoic acid ammonium salts, dodecylnaphthoic acid ammonium salts, stearylnaphthoic acid ammonium salts, dipropylnaphthoic acid ammonium salts, dibutynaphthoic acid ammonium salts, dihexylnaphthoic acid ammonium salts, methyl dodecylnaphthoic acid ammonium salts, isomers of aforementioned materials, and mixtures thereof.

34. The multi-color ink jet printing process of claim 27 wherein said anti-intercolor bleed agent is selected from the group consisting of formic acid methylammonium salts, acetic acid pentylammonium salts, propionic acid dipropylammonium salts, hexanoic acid triethylammonium salts, heptanoic acid 2-hydroxethylammonium salts, octanoic acid bis(2-hydroxyethyl)ammonium salts, decanoic acid methylammonium salts, decanoic acid dimethylammonium salts, decanoic acid trimethylammonium salts, decanoic acid tri(2-hydroxyethyl) ammonium salts, dodecanoic acid methylammonium salts, dodecanoic acid dimethylammonium salts, dodecanoic acid trimethylammonium salts, myristic acid methylammonium salts, stearic acid methylethylammonium salts, stearic acid dimethylammonium salts, stearic acid trimethylammonium salts, stearic acid methylpiperidinium salts, oleic acid methylammonium salts, oleic acid morpholinoammonium salts, palmitic acid methylammonium salts, palmitoleic acid methylammonium salts, fatty acid ethylammonium salts, cyclohexanoic acid dibutylammonium salts, hexylcyclohexanoic acid trimethylammonium salts, dodecyclohexanoic acid methylammonium salts, dibutylcycloheptanoic acid methylethylammonium salts, pentylcycloheptanoic acid dimethylammonium salts, cyclooctanoic acid propylammonium salts, propylbenzoic acid triethylammonium salts, hexylbenzoic acid trimethylammonium salts, octylbenzoic acid methylammonium salts, dodecylbenzoic acid piperidinoammonium salts, stearylbenzoic acid methylammonium salts, dipropylbenzoic acid 3-hydroxpropylammonium salts, dibutylbenzoic acid ethylpropylammonium salts, dihexylbenzoic acid methylammonium salts, methyl dodecylbenzoic acid ethylammonium salts, ethyl stearylbenzoic acid 2-hydroxyethylammonium salts, isomers of aforementioned materials, and mixtures thereof.

35. The multi-color ink jet printing process of claim 27 wherein said ink jet ink composition further comprises a humectant selected from the group consisting of glycols containing ethylene glycol, propylene glycol, diethylene glycol, dipropylene glycol, triethyleneglycol, tetraethyleneglycol, pentaethyleneglycol, tripropyleneglycol, and tetrapropyleneglycol; polyglycols consisting of polyethylene glycol, polypropylene glycol, and poly(ethyelenglycol-co-propyleneglycol); triols consisting of glycerine, trimethylolpropane, 1,3,5-pentanetriols, 1,2,5-petanetriols, 1,3,5-hexanetriols, and 1,2,5-hexanetriols; reaction products of all aforementioned glycols or triols with alkylethyleneoxides selected from the group consisting of ethyleneoxide, propyleneoxide, and mixtures thereof; sulfoxides; sulfones selected from the group consisting of sulfolane and dimethylsulfone; amides selected from the group consisting of N,N-dimethylforamide, 2-pyrrolidinone, N-methylpyrrolidinone, N-methylacetamide, N,N-dimethylacetamide, and caprolactam; N-hydroxyamides selected from the group consisting of N-acetylethanolamine, N-acetylpropanolamine, and N-hydroxyethylpyrrolidinone; ureas; betaines; glycol ethers selected from the group consisting of ethylcarbitol, propylcarbitol, butylcarbitol, and cellusolve; polyglycolethers; alcohols selected from the group consisting of 1,3-propanediol, 1,4-butanediol, 1,5-pentanediol, 1,6-hexanediol, n-hexanol, n-petanol, n-butanol, n-propanol, isopropanol, ethanol, and methanol; thios of the aforementioned hydroxyl containing compounds; amino alcohols; isomers of aforementioned materials; and their mixtures thereof.

36. The multi-color ink jet printing process of claim 35 wherein the said ink jet ink composition further comprises an additive selected from the group consisting of penetrants, biocides, surfactants, pigment dispersants, jetting aids, anti-bleed agents, pH buffering agents, chelating agents, water soluble polymers, anti-kogation agents, anti-curling agents, anti-cockle agents, microwave couplers, and combinations thereof.

37. The multi-color ink jet ink printing process of claim 21, wherein said ink jet process is a drop-on-demand ink jet printing process selected from the group consisting of thermal, piezoelectric, and acoustic ink jet printing processes.

* * * * *